(12) United States Patent
Ito

(10) Patent No.: US 12,015,650 B2
(45) Date of Patent: Jun. 18, 2024

(54) INFORMATION PROCESSING APPARATUS FOR SETTING VALUES IN USE ENVIRONMENTS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Yuki Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/153,215

(22) Filed: Jan. 11, 2023

(65) Prior Publication Data

US 2023/0231887 A1 Jul. 20, 2023

(30) Foreign Application Priority Data

Jan. 14, 2022 (JP) ................................ 2022-004123
Oct. 12, 2022 (JP) ................................ 2022-163765

(51) Int. Cl.
*H04L 9/40* (2022.01)
*G06F 3/12* (2006.01)

(52) U.S. Cl.
CPC .......... *H04L 63/205* (2013.01); *G06F 3/1204* (2013.01); *G06F 3/1222* (2013.01); *G06F 3/1238* (2013.01); *G06F 3/1257* (2013.01); *H04L 63/02* (2013.01)

(58) Field of Classification Search
None
See application file for complete search history.

(56) References Cited

U.S. PATENT DOCUMENTS

| | | | |
|---|---|---|---|
| 2007/0139699 A1 | 6/2007 | Kim | |
| 2014/0333958 A1* | 11/2014 | Oshima | H04N 1/32797 358/1.15 |
| 2016/0277638 A1 | 9/2016 | Mochizuki | |
| 2019/0272130 A1 | 9/2019 | Torigoshi | |
| 2020/0314108 A1* | 10/2020 | Ogawa | H04L 63/105 |

FOREIGN PATENT DOCUMENTS

| | | |
|---|---|---|
| EP | 4195023 A1 | 6/2023 |
| JP | 2020154832 A | 9/2020 |

* cited by examiner

*Primary Examiner* — Thomas D Lee
(74) *Attorney, Agent, or Firm* — Canon U.S.A., Inc., IP Division

(57) ABSTRACT

An information processing apparatus stores a plurality of setting values prepared for making a setting of the information processing apparatus, receives selection of one item from a user from among a plurality of items associated with a plurality of use environments, as a use environment corresponding to a first communication interface, receives selection of one item from a user from among a plurality of items associated with the plurality of use environments, as a use environment corresponding to a second communication interface, and makes a setting based on a first setting value group that is included in the plurality of setting values and corresponds to an environment selected as a use environment corresponding to the first communication interface, and a second setting value group that is included in the plurality of setting values and corresponds to an environment selected as a use environment corresponding to the second communication interface.

15 Claims, 10 Drawing Sheets

INFORMATION PROCESSING APPARATUS FOR SETTING VALUES IN USE ENVIRONMENTS, CONTROL METHOD OF INFORMATION PROCESSING APPARATUS, AND STORAGE MEDIUM

BACKGROUND OF THE INVENTION

Field of the Invention

The present invention relates to an information processing apparatus connected to a network.

Description of the Related Art

There have been recently a growing number of information processing apparatuses that include a plurality of communication interfaces, each information processing apparatus being connected to a plurality of local area networks (LANs) to be used. For example, in some cases, security function settings that differ for each communication interface are desired to be made because a connected user varies for each network.

Japanese Patent Application Laid-Open No. 2020-154832 discusses a technique of making a setting of a network filter function for each communication interface.

Meanwhile, information processing apparatuses have been used in various environments, such as a telework environment and a public space shared by unspecified users, and a required setting has become complicated.

SUMMARY OF THE INVENTION

The present invention is directed to providing a structure for collectively making settings suitable for use environments corresponding to communication interfaces in an information processing apparatus having a plurality of communication interfaces.

According to an aspect of the present invention, an information processing apparatus including a first communication interface and a second communication interface includes a storage unit configured to store a plurality of setting values prepared for making a setting of the information processing apparatus, a first reception unit configured to receive, from a user, selection of one item from among a plurality of items associated with a plurality of use environments, as a use environment corresponding to the first communication interface, a second reception unit configured to receive, from a user, selection of one item from among a plurality of items associated with the plurality of use environments, as a use environment corresponding to the second communication interface, and a setting unit configured to make a setting of the information processing apparatus based on a first setting value group that is included in the plurality of setting values stored in the storage unit, and corresponds to a use environment associated with an item selected by the first reception unit, and a second setting value group that is included in the plurality of setting values stored in the storage unit, and corresponds to a use environment associated with an item selected by the second reception unit.

Further features of the present invention will become apparent from the following description of exemplary embodiments with reference to the attached drawings.

DESCRIPTION OF THE EMBODIMENTS

Hereinafter, exemplary embodiments of the present invention will now be described with reference to the drawings. The following exemplary embodiments are not intended to limit the invention according to the scope of the claims. In addition, not all the combinations of features described in the exemplary embodiments are always essential to the solution of the invention.

Figure 1:
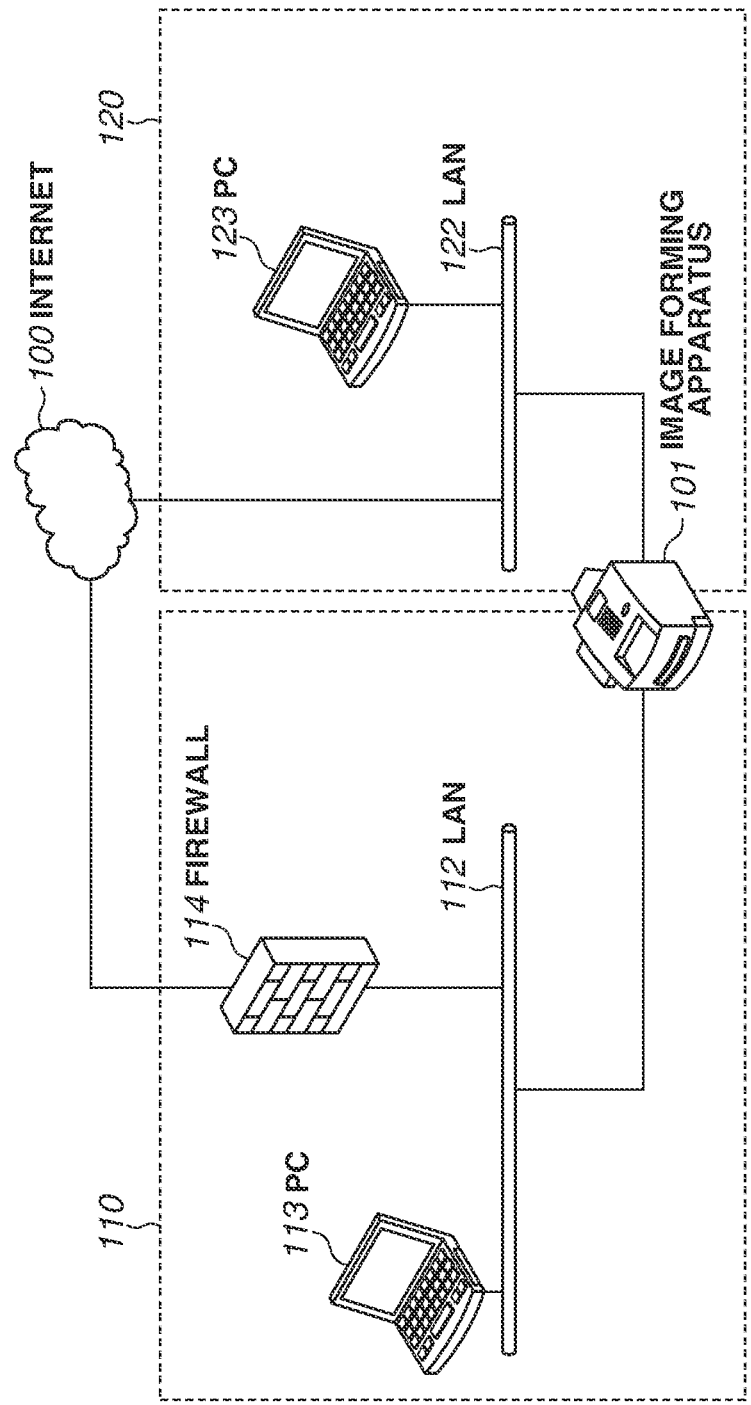
FIG. 1 is a diagram illustrating an example of an information processing system.

FIG. 1 is a diagram illustrating an example of an information processing system according to a first exemplary embodiment. An image forming apparatus 101 serving as an example of an information processing apparatus according to the present exemplary embodiment includes two wired communication interfaces, and the two wired communication interfaces are respectively connected to different networks. In the present exemplary embodiment, a use environment 110 exemplified in FIG. 1 will be referred to as an in-company intranet environment 110, and a use environment 120 exemplified in FIG. 1 will be referred to as an Internet direct connection environment 120. The use environment 110 is regarded as a use environment of a main line and the use environment 120 is regarded as a use environment of a sub line.

The in-company intranet environment 110 is an environment in which the image forming apparatus 101 and a personal computer (PC) 113 are connected via an in-company local area network (LAN) 112. At the boundary between the LAN 112 and an internet 100, a firewall 114 is installed.

In other words, communication executed between each information processing apparatus in the in-company intranet environment 110 and the Internet 100 is monitored and protected by the firewall 114. For this reason, in the in-company intranet environment 110, dangers, such as an access to each information processing apparatus by an attacker from the Internet 100, is drastically reduced.

In contrast, in the Internet direct connection environment 120, a firewall is not installed. The Internet direct connection environment 120 is an environment in which the image forming apparatus 101 and a PC 123 are directly connected to the Internet 100 via a LAN 122, and perform communication without being monitored and protected by a firewall. For this reason, an information processing apparatus, such as the image forming apparatus 101 and the PC 123, needs to take measures against dangers, such as an access by an attacker from the Internet 100, by using a personal firewall function in each information processing apparatus.

In the present exemplary embodiment, environments in which information processing apparatuses, such as image forming apparatuses, are used are classified into six categories: the use environments 110 and 120 illustrated in FIG. 1, and an Internet-prohibited environment, a teleworking environment, a public space environment, and a highly-confidential information management environment that are not illustrated in FIG. 1. The main line or the sub line is provided with a collective setting function of collectively making security function settings suitable for the categories.

The above-described category classifications are not intended to limit the present invention, and environments may be classified into a part of categories exemplified in the present exemplary embodiment, or may be classified into other categories. For example, on the assumption that information processing apparatuses are installed inside a company, environments may be classified by business categories, such as finance business and public business. Environments may also be classified into category levels corresponding to security strengths.

An information processing apparatus includes a wide variety of setting items in addition to setting items related to a security function. In the present exemplary embodiment, a collective setting function of collectively making settings related to the security function is provided, but a collective setting function of collectively making settings other than security function settings may be provided.

Hereinafter, the four use environments that are not illustrated in FIG. 1 will be described.

The Internet-prohibited environment is a closed-area network environment isolated from a different network, such as the Internet 100. In the Internet-prohibited environment, each information processing apparatus is connected via a LAN, and network communication is executable between information processing apparatuses on the LAN. Each information processing apparatus is not accessed by an unspecified user on the Internet 100.

The teleworking environment is an environment in which information processing apparatuses are connected via a home LAN. The home LAN is a private network composed of a home router, but security countermeasures taken by a robust firewall as in the in-company intranet environment 110 are not adapted. For this reason, similarly to the Internet direct connection environment 120, information processing apparatuses installed in the teleworking environment need to take measures against dangers, such as an access by an attacker from the Internet 100, by using a personal firewall function in each information processing apparatus.

The public space environment is an environment in which unspecified users can physically access an information processing apparatus, and unspecified users can use a network in the environment in common.

The highly-confidential information management environment is an environment in which highly-confidential information is handled. The environment in which highly-confidential information is handled is referred to as an environment in which a top priority is given to security countermeasures.

A classification method according to the present exemplary embodiment that is to be used in classifying use environments of information processing apparatuses into the above-described six categories will now be described.

Here, an environment in which highly-confidential information is handled is defined as the highly-confidential information management environment. Environments in which highly-confidential information is not handled are defined as the other five environment.

Depending on whether an environment is under strict entry management, the five environments are further classified into two groups. The in-company intranet environment 110, the Internet direct connection environment 120, and the Internet-prohibited environment are defined as environments under strict entry management. The teleworking environment and the public space environment are defined as environments not under strict entry management.

The teleworking environment and the public space environment are classified depending on whether unspecified users use a network in an environment in common. An environment in which unspecified users use a network in the environment in common is defined as the public space environment. An environment in which unspecified users do not use a network in the environment in common is defined as the teleworking environment.

The in-company intranet environment 110, the Internet direct connection environment 120, and the Internet-prohibited environment are classified depending on whether an environment is an Internet-connected environment. An environment that is not an Internet-connected environment is defined as the Internet-prohibited environment. Out of the Internet-connected environments, an environment in which a firewall is installed is defined as the in-company intranet environment 110, and an environment in which a firewall is not installed is defined as the Internet direct connection environment 120.

The above-described six categories, and security countermeasures to be taken for each category will be described with reference to Table 1.

TABLE 1

|  | In-company intranet environment | Internet direct connection environment | Internet-prohibited environment |
|---|---|---|---|
| Communication path encryption | On | On |  |
| Legacy protocol disabling | On | On |  |
| Personal firewall activation |  | On |  |
| Authentication safety enhancement | On | On |  |
| Physical attack countermeasure |  |  |  |

TABLE 1-continued

| | Telework environment | Public space environment | Highly-confidential information management environment |
|---|---|---|---|
| File sharing function disabling | | On | |
| External storage device disabling | On | On | On |

| | Telework environment | Public space environment | Highly-confidential information management environment |
|---|---|---|---|
| Communication path encryption | On | On | On |
| Legacy protocol disabling | On | On | On |
| Personal firewall activation | On | On | On |
| Authentication safety enhancement | On | On | On |
| Physical attack countermeasure | On | On | On |
| File sharing function disabling | | On | On |
| External storage device disabling | On | On | On |

Target items of security function collective settings according to the present exemplary embodiment are seven items listed in Table 1.

Communication path encryption is a security countermeasure to prevent information leakage by encrypting information communicated on a network. As an example of a function of implementing the communication path encryption, there is Transport Layer Security (TLS). Because of eavesdropping of communicated content by a third party in an Internet-connected environment, communication path encryption is desirable. In other words, the execution of communication path encryption is recommended except for a case in the Internet-prohibited environment.

Deactivation of a legacy protocol is a security countermeasure to prevent impersonation and information leakage by disabling a function that uses an unsafe legacy communication protocol. As an example of a legacy protocol, there is Windows Internet Name Service (WINS). Similarly to the communication path encryption, it is also desirable to set to deactivate the legacy protocol in an environment in which an information processing apparatus is connected to an external network, such as the Internet. In other words, deactivation of the legacy protocol is recommended in an environment except for the Internet-prohibited environment.

A personal firewall is a firewall to be installed onto an information processing apparatus. Similarly to a normal firewall, the personal firewall monitors communication between an information processing apparatus and an external network such as the Internet. An Internet protocol (IP) filter and a port number filter are example of a firewall. The IP filter is a security countermeasure that reads transmission destination information and transmission source information of a communication packet, and permits a preset communication packet. An unauthorized access and information leakage can thereby be prevented. The port number filter is a security countermeasure to prevent entry from a port by closing a port not to be used. A denial of service (DOS) attack, which is a cyberattack of causing vulnerability by applying vast amount of load, can be thereby prevented. Because of a possibility of information leakage and the DOS attack in an environment in which an information processing apparatus is connected to an external network and a firewall is not installed, it is desirable to activate a personal firewall. In other words, except for the Internet-prohibited environment in which an information processing apparatus is not connected to an external network, and the in-company intranet environment 110 in which a firewall is installed, the personal firewall activation is recommended. As an example of the personal firewall activation, a default policy of an IP address filter is denied. Alternatively, a subnet address indicating a network to which an image forming apparatus belongs is set as an exception address of an IP address filter. Specifically, a filtering condition is set in such a manner as to permit communication from an address range corresponding to the subnet, and to deny communication from other address ranges.

Authentication safety enhancement refers to strengthening a countermeasure against impersonation by, for example, prohibiting caching of a password and designating the minimum number of characters of a password. Except for the Internet-prohibited environment in which information processing apparatuses are connected within an isolated network, there is a possibility of impersonation. It is therefore desirable to enhance authentication safety.

A physical attack countermeasure is a security countermeasure for preventing physical information leakage. In the image forming apparatus 101, temporary data, such as a print job, is generated on a hard disc. The image forming apparatus 101 includes a complete erasing function of completely erasing the generated temporary data automatically at a time of a job end. The above-described complete erasing function serves as an example of the physical attack countermeasure of the image forming apparatus 101. As long as such a function is set, even in a case where a hard disc is physically removed, temporary data is never read. In the present exemplary embodiment, the teleworking environment and the public space environment are defined as environments not under strict entry management. In the teleworking environment and the public space environment, which are environments not under strict entry management and unable to restrict a physical access to an information processing apparatus, it is desirable to take the physical attack countermeasure. Also in the highly-confidential information management environment in which a top priority is given to a risk reduction of information leakage, it is desirable to take the physical attack countermeasure.

A file sharing function is a function to share a file on a network in an environment. In an environment in which unspecified users share a network in the environment, it is deactivate the file sharing function to prevent information leakage. In other words, except for a private network environment in which specific users share a network in the environment, it is recommended to deactivate a file sharing function. In the present exemplary embodiment, private network environments are defined as the in-company intranet environment 110, the Internet-prohibited environment, and the teleworking environment. Thus, in the environments excluding these private network environments, i.e., the Internet direct connection environment 120, the public space environment, and the highly-confidential information management environment, deactivation of the file sharing function is recommended. As an example of setting the file sharing function, there is a server message block (SMB) server setting.

Deactivation of an external storage device refers to, for example, setting a universal serial bus (USB) storage device to be unusable as an external storage device in an information processing apparatus. With this setting, it is possible to prevent information from being written onto an external storage device, and prevent information leakage. It is also possible to prevent infection with a computer virus via the USB storage device, and information leakage caused by the infection. Dangers of information leakage via an external storage device, such as a USB storage device, are common to all use environments. It is therefore desirable to deactivate an external storage device in all use environment.

Table 1 organizes the above-described recommended setting values. As for items recommended to be set, "On" is shown, and as for items for which whichever of "On" and "Off" may be set, diagonal lines are drawn.

<Hardware Configuration of Image Forming Apparatus>

Figure 2:
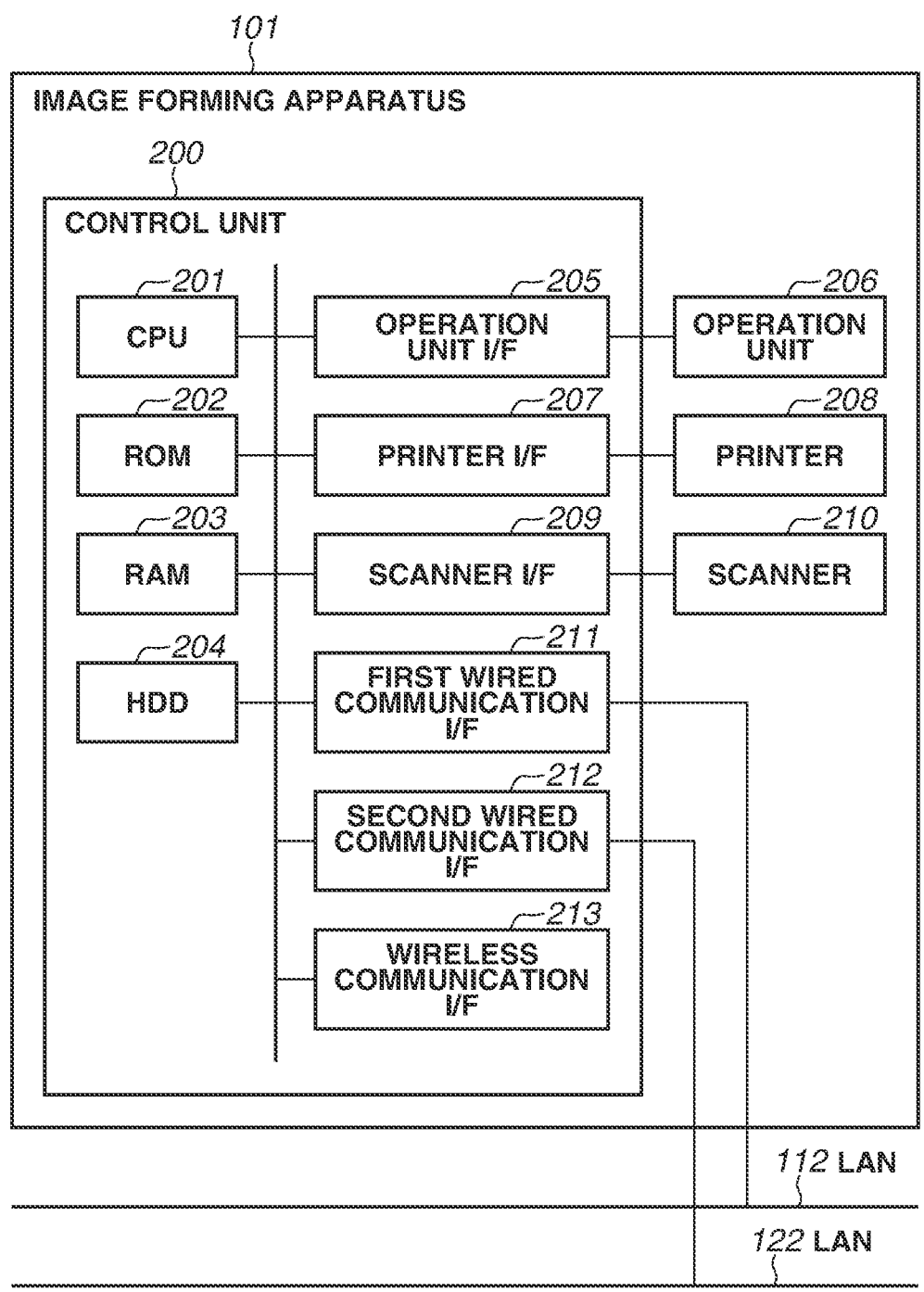
FIG. 2 is a diagram illustrating an example of a hardware configuration of an image forming apparatus.

A hardware configuration of the image forming apparatus 101 serving as an example of an information processing apparatus according to the present exemplary embodiment will be described with reference to FIG. 2. Only the image forming apparatus 101 will be described with reference to FIG. 2, but an image forming apparatus to be used in the environments not illustrated in FIG. 1 is also assumed to have a configuration similar to that of the image forming apparatus 101.

As described above, in the present exemplary embodiment, the image forming apparatus 101 will be described as an example of an information processing apparatus, but the information processing apparatus is not limited to this. For example, the information processing apparatus may be a single function peripheral (SFP), such as a scanner or a printer, that includes a single function. The present exemplary embodiment can be applied to a wide variety of communication devices connected to a network, such as a three-dimensional (3D) printer, a smartphone, a digital camera, a network camera, and a television, and an Internet of Things (IOT) device.

A control unit 200 including a central processing unit (CPU) 201 controls operations of the entire image forming apparatus 101. A read only memory (ROM) 202 stores a program to be executed by the CPU 201. The CPU 201 performs various types of control of the image forming apparatus 101, such as a reading control and transmission control, by reading out control programs stored in the ROM 202. A random access memory (RAM) 203 is used as a temporary storage region, such as a main memory or a work area of the CPU 201. A hard disk drive (HDD) 204 is a storage device storing image data, various programs, and various types of setting information. The HDD 204 may also include another storage device, such as a solid state drive (SSD). In this manner, hardware components, such as the CPU 201, the ROM 202, the RAM 203, and the HDD 204, constitute a so-called computer.

An operation unit interface (I/F) 205 connects an operation unit 206 and the control unit 200.

The operation unit 206 includes a liquid crystal display unit having a touch panel function, and various hardware keys. The operation unit 206 functions as a display unit that displays information to the user, and a reception unit that receives an instruction of the user.

A printer I/F 207 connects a printer 208 and the control unit 200. Image data to be printed by the printer 208 is transferred from the control unit 200 via the printer I/F 207. The input image data is output onto a recording medium in the printer 208. A scanner I/F 209 connects a scanner 210 and the control unit 200. The scanner 210 generates image data by reading a document placed on a platen (not illustrated). The generated image data is input to the control unit 200 via the scanner I/F 209.

Network cables are connected to a first wired communication I/F 211 and a second wired communication I/F 212. The first wired communication I/F 211 connects the control unit 200 and the LAN 112. The first wired communication I/F 211 transmits image data or information to an external apparatus on the LAN 112, and receives various types of information from an external apparatus on the LAN 112. The second wired communication I/F 212 connects the control unit 200 and the LAN 122. The second wired communication I/F 212 transmits image data or information to an external apparatus on the LAN 122, and receives various types of information from an external apparatus on the LAN 122. A wireless communication I/F 213 connects the control unit 200 and a wireless LAN. The wireless communication I/F 213 is used in place of the first wired communication I/F 211 or the second wired communication I/F 212. Among the three I/Fs, any one I/F serves as a main line, and one I/F different from the main line serves as a sub line. In the present exemplary embodiment, the first wired communication IF 211 is connected to the LAN 112 corresponding to the in-company intranet environment 110 to serve as a main line. The second wired communication I/F 212 connected to the LAN 122 corresponding to the Internet direct connection environment 120 serves as a sub line. In the present exemplary embodiment, a case where one of the second wired communication I/F 212 and the wireless communication I/F 213 is available is assumed, and it is assumed that the number of communication interfaces that can be used at one time is limited to two. In a case where a wireless communication I/F is used, a wireless communication I/F serves as a sub line.

<Software Configuration of Image Forming Apparatus>

Figure 3:
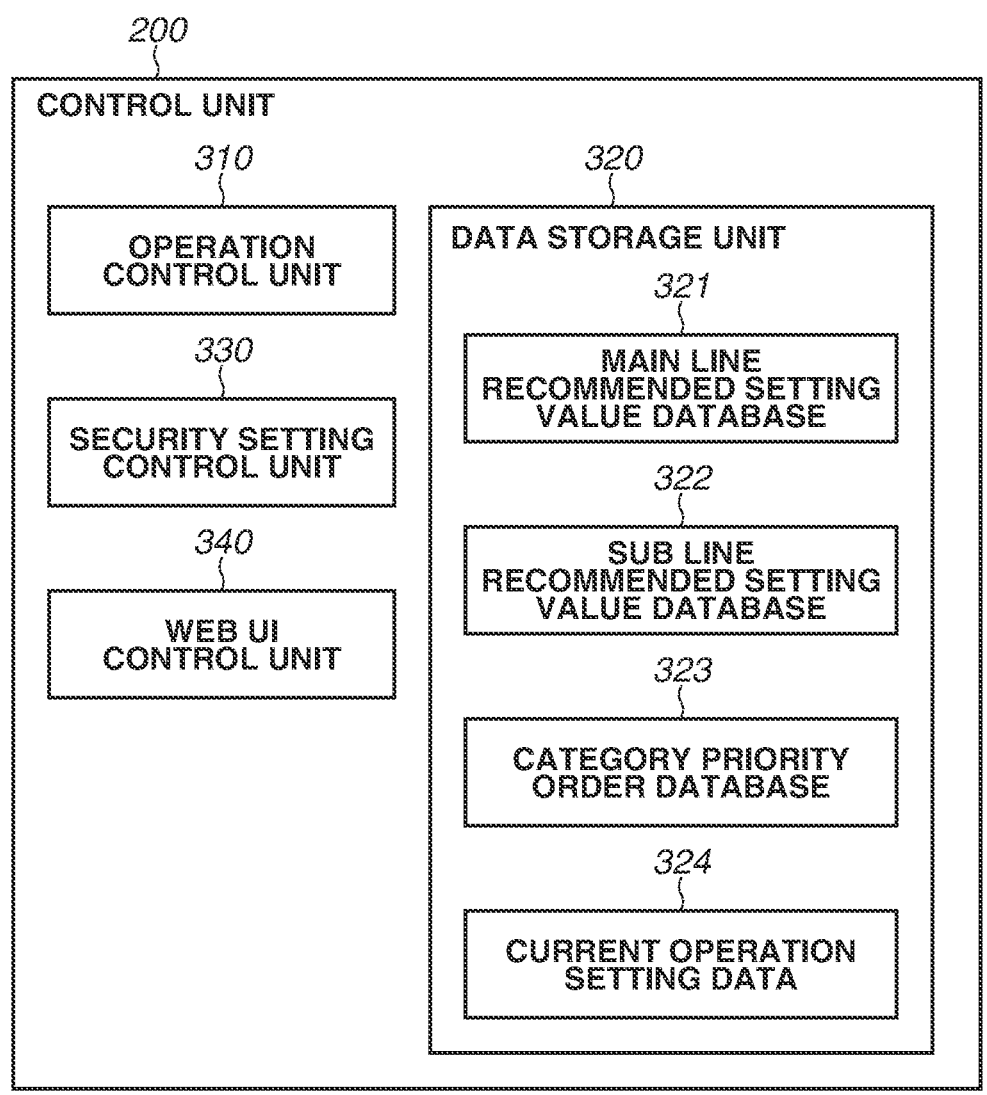
FIG. 3 is a diagram illustrating an example of a software configuration of the image forming apparatus.

A software configuration of the image forming apparatus 101 serving as an example of an information processing apparatus according to the present exemplary embodiment will now be described with reference to FIG. 3. Each component illustrated in FIG. 3 is implemented by the CPU 201 executing a program stored in the ROM 202 that corresponds to the component.

An operation control unit 310 displays a screen for the user on the operation unit 206. The operation control unit 310 also detects an operation of the user, and switches the screen or updates the display based on the detection result.

A data storage unit 320 stores data onto the HDD 204 or reads out data from the HDD 204 in accordance with a request from another control unit. The data storage unit 320 stores setting information for determining an operation of the image forming apparatus 101 and information regarding a setting of a security function. Specifically, the data storage unit 320 stores a main line recommended setting value database 321, a sub line recommended setting value database 322, a category priority order database 323, and current operation setting data 324.)

The main line recommended setting value database 321 and the sub line recommended setting value database 322 each refer to a setting data group including a combination of a setting item and a setting value of a security function for each category corresponding to an environment in which the image forming apparatus 101 is used.

The main line recommended setting value database 321 will now be described with reference to Table 2. Table 2 describes more detailed setting items and recommended setting data of each category as for the seven setting items described with reference to Table 1.

A setting regarding a personal firewall varies between a main line and a sub line. For this reason, the main line recommended setting value database 321 stores recommended setting data unique to a main line. In the present exemplary embodiment, settings other than the setting regarding a personal firewall are settings shared by a main line and a sub line. A shared setting is a setting of which a common setting value is referred to in processing that uses a main line and a sub line.

TABLE 2

| Main line recommended setting value database 321 | | | | | |
|---|---|---|---|---|---|
| | | | In-company intranet type | Internet-prohibited type | Internet direct connection type |
| Setting shared by main line and sub line | Setting regarding communication path encryption | TLS setting | On | | On |
| | Setting regarding legacy protocol | WINS setting | Off | | Off |
| | Setting regarding authentication safety | Caching of authentication password of external server | Prohibited | | Prohibited |
| | | Setting of minimum number of characters of password | Eight characters | | Eight characters |
| | Setting regarding physical attack countermeasure | Job erasing setting | | | |
| | Setting regarding file sharing function | SMB server setting | | | Off |
| | Setting regarding external storage device | Use of USB external storage device | Off | Off | Off |
| Setting unique to main line | Setting regarding personal firewall for main line | Default policy of IP address filter of main line | | | Denied |
| | | Exception address of IP address filter of main line | | | Subnet address of image forming apparatus of main line |

| | | | In-home type | Public space type | Highly-confidential information management type |
|---|---|---|---|---|---|
| Setting shared by main line and sub line | Setting regarding communication path encryption | TLS setting | On | On | On |
| | Setting regarding legacy protocol | WINS setting | Off | Off | Off |

TABLE 2-continued

| | Setting regarding authentication safety | Caching of authentication password of external server | Prohibited | Prohibited | Prohibited |
|---|---|---|---|---|---|
| | | Setting of minimum number of characters of password | Eight characters | Eight characters | Eight characters |
| | Setting regarding physical attack countermeasure | Job erasing setting | On | On | On |
| | Setting regarding file sharing function | SMB server setting | | Off | Off |
| | Setting regarding external storage device | Use of USB external storage device | Off | Off | Off |
| Setting unique to main line | Setting regarding personal firewall for main line | Default policy of IP address filter of main line | Denied | Denied | Denied |
| | | Exception address of IP address filter of main line | Subnet address of image forming apparatus of main line | Subnet address of image forming apparatus of main line | Subnet address of image forming apparatus of main line |

As for an item recommended to be set, the recommended setting value is described. As for an item that is not recommended to be set and needs not be set, a diagonal line is drawn.

The sub line recommended setting value database 322 is a database obtained by replacing setting items and setting values that are unique to a main line, with setting items and setting values that are unique to a sub line. In the present exemplary embodiment, the sub line recommended setting value database 322 is a database obtained by replacing setting items and setting values of a personal firewall for a main line in Table 2, with setting items and setting values of a personal firewall for a sub line. Because the sub line recommended setting value database 322 has a format similar to the main line recommended setting value database 321, the illustration of a table is omitted.

In the present exemplary embodiment, the main line recommended setting value database 321 and the sub line recommended setting value database 322 store a True/False boolean value for each setting item. As for a setting value of which a recommended setting, such as "On", "Off", "Prohibited", or "Eight characters", is described in Table 2, True is stored. As for a setting value for which a diagonal line is drawn in Table 2, False is stored. In a case where a boolean value is True, recommended setting data to be applied that is described in Table 2 is also stored. In a case where a collective setting is to be made, a security setting control unit 330 to be described below changes a setting using corresponding recommended setting data, as for a setting item for which True is stored as a boolean value. In contrast, as for a setting item for which False is stored as a boolean value, control is performed in such a manner that a setting is not changed from a current setting value. The data storing method and the setting control method are mere examples, and are not limited to this.

In the present exemplary embodiment, a plurality of setting values prepared for making a setting of the image forming apparatus 101 is stored in the form of the main line recommended setting value database 321 and the sub line recommended setting value database 322, but the configuration is not limited to this. For example, the two databases may be collectively stored as one database, and necessary data may be extracted and used in setting control processing.

The category priority order database 323 is a database for determining which recommended setting data is to be preferentially applied, a category corresponding to a main line and a category corresponding to a sub line, when a setting value of a setting item shared by the main line and the sub line is determined. An example of the category priority order database 323 is shown in Table 3.

TABLE 3

| Category priority order database 323 | |
|---|---|
| Priority order | Category |
| 6 | Highly-confidential information management environment |
| 5 | Public space environment |
| 4 | In-home environment |
| 3 | Internet direct connection environment |
| 2 | In-company intranet environment |
| 1 | Internet-prohibited environment |

In the present exemplary embodiment, a priority of each category is represented by a numerical value, and a category with a large value is regarded as a category to be prioritized. The category priority order database 323 is defined to give a higher priority to a use environment with stricter security. A storage method of a priority order is not limited to this. For example, when a priority order is represented by a numerical value, a category with a small value may be regarded as a category to be prioritized. In addition, a determination method of a priority is not limited to this, and a value of a priority of each category may be any value. For example, a total number of setting items for which True is stored as boolean values may be calculated from the main line recommended setting value database 321 and the sub line recommended setting value database 322, and the calculated value may be used as a priority. Furthermore, after an importance degree is defined for each setting item, weighting may be performed for each setting item, and a weighted total number of setting items for which True is stored may be calculated and used as a priority.

Referring back to FIG. 3, the current operation setting data 324 is a setting data group including a combination of a setting item and a setting value that is currently applied to the image forming apparatus 101. At the time of a setting change, the security setting control unit 330 to be described below rewrites the current operation setting data 324. After that, the security setting control unit 330 reboots the image forming apparatus 101. If the image forming apparatus 101 is rebooted, a program reads out new current operation setting data 324, and the image forming apparatus 101 operates with a new setting.

The security setting control unit 330 makes a collective setting of a security function of the image forming apparatus 101 in accordance with an instruction from the user that is detected by the operation control unit 310. Specific description of setting control will be described below. The collective setting according to the present exemplary embodiment is a function that can collectively set recommended setting values of a typical security function defined by a vendor. Hereinafter, the function will also be referred to as a security collective setting function. In the present exemplary embodiment, the seven setting items described with reference to Table 1 are regarded as setting targets in the security collective setting function. There has been known a function of applying a security policy defined by an organization, to an image forming apparatus, and prohibiting a setting of a specific security setting item from changing to a setting unsuitable for the policy. This function and the security collective setting function of the present exemplary embodiment are different in property. In other words, even in a case where a user, such as an administrator, makes a collective setting using the security collective setting function, the user can change a setting value of an individual setting item to another setting value again via an individual setting change screen (not illustrated) in accordance with an actual use situation.

A web user interface (UI) control unit 340 controls a setting screen to be displayed on an external information processing apparatus, such as the PC 113 or the PC 123, via the first wired communication I/F 211, the second wired communication I/F 212, or the wireless communication I/F 213. The user can refer to and change a setting of the image forming apparatus 101 by using a setting screen on a web browser provided by the web UI control unit 340. The web UI control unit 340 may also include a function of importing and exporting the main line recommended setting value database 321, the sub line recommended setting value database 322, or the category priority order database 323. If such a function is included, the user can create and edit a data file related to each database, on an external information processing apparatus. The user can also transmit an edited database to the image forming apparatus 101 and store the edited database into the data storage unit 320. The web UI control unit 340 can also be omitted in the present exemplary embodiment.

<Setting Screen of Image Forming Apparatus>

Figure 4:
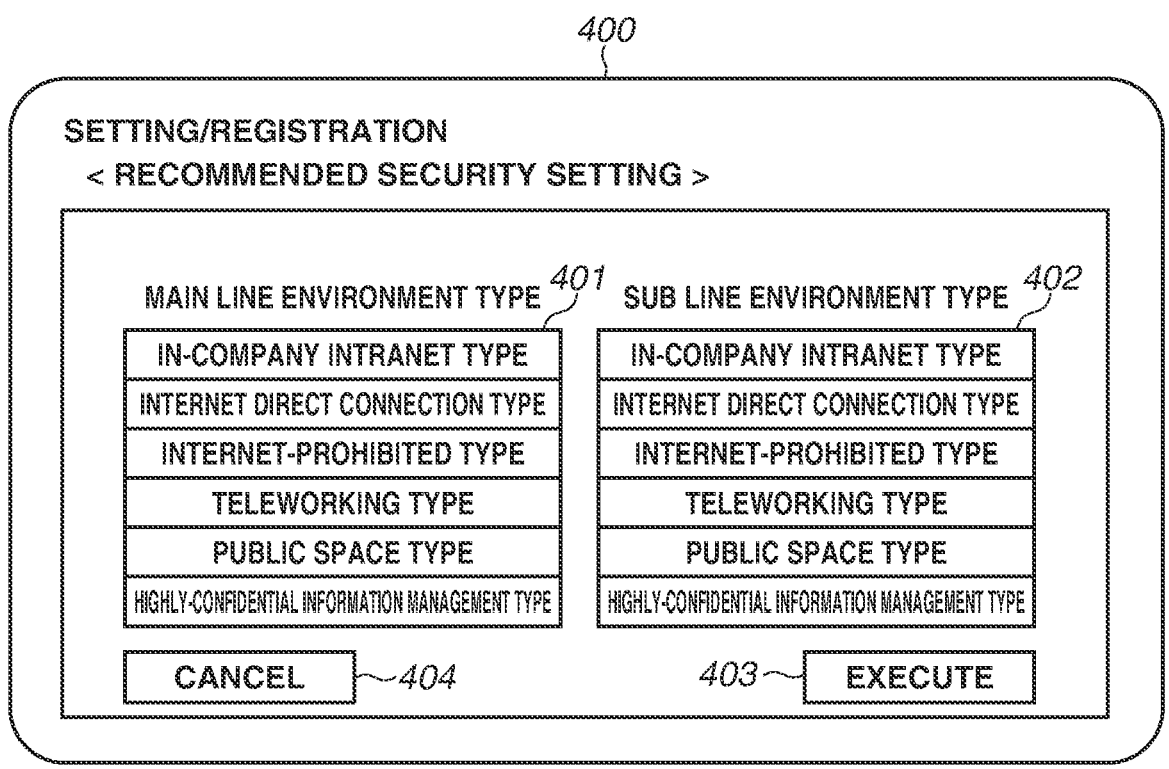
FIG. 4 is a diagram illustrating an example of a screen to be displayed on an operation unit of the image forming apparatus.

A setting screen 400 to be displayed on the operation unit 206 of the image forming apparatus 101 will now be described with reference to FIG. 4. In the present exemplary embodiment, the setting screen 400 to be displayed on the operation unit 206 of the image forming apparatus 101 will be described, but the setting screen is not limited to this. For example, a web page similar to the setting screen 400 can be provided to a web browser of an external information processing apparatus using the web UI control unit 340, and a setting operation can be performed via the web page.

The setting screen 400 is a screen to be displayed by the operation control unit 310 on the operation unit 206. If the user performs an operation of displaying the setting screen 400, on a menu screen (not illustrated), the operation control unit 310 detects the operation and displays the setting screen 400. A main line environment list box 401 is a region for the user to select a use environment of a main line. In the present exemplary embodiment, the above-described six use environments are displayed as options. In the main line environment list box 401, the user can select one option from among a plurality of options. A sub line environment list box 402 is a region for the user to select a use environment of a sub line, and six use environments are displayed as options similarly to the main line environment list box 401. Also in the sub line environment list box 402, the user can select one option from among a plurality of options. The user selects a use environment of a main line of the image forming apparatus 101 from among options in the main line environment list box 401. The user further selects a use environment of a sub line of the image forming apparatus 101 from among options in the sub line environment list box 402. The user then presses an execute button 403. The operation control unit 310 of the image forming apparatus 101 detects a user operation, and transmits information indicating a result of selection made by the user, to the security setting control unit 330. The security setting control unit 330 collectively makes settings of the security function that are suitable for use environments selected by the user and received from the operation control unit 310. A cancel button 404 is a button for ending the collective setting function. If the cancel button 404 is pressed, the menu screen (not illustrated) is displayed, and the display of the setting screen 400 is ended.

In the present exemplary embodiment, the description will be given of a configuration in which the user selects the respective use environments of the main line and the sub line in both of the main line environment list box 401 and the sub line environment list box 402, but the configuration is not limited to this. The execute button 403 may be made pressable on the setting screen 400 even in a state in which a use environment is selected only in either the main line environment list box 401 or the sub line environment list box 402. In a case where a use environment in the main line environment list box 401 is selected, a security function setting suitable for the selected use environment is made for a setting item unique to the main line and a setting item shared by the main line and the sub line. Alternatively, in a case where a use environment in the sub line environment list box 402 is selected, a security function setting suitable for the selected use environment is made for a setting item unique to the sub line and a setting item shared by the main line and the sub line. In a case where use environments are selected in both of the main line environment list box 401 and the sub line environment list box 402, processing similar to the processing in the present exemplary embodiment is performed. With this configuration, it becomes possible to make a collective setting for at least one of the main line and the sub line.

The setting screen 400 of the present exemplary embodiment has a configuration in which the main line environment list box 401 and the sub line environment list box 402 are displayed on one screen, but the configuration is not limited to this. For example, two screens corresponding to a main line environment selection screen and a sub line environment selection screen may be separately displayed. Hereinafter, a specific example will be described.

If the user operates to display a setting screen of the collective setting function, the operation control unit 310 detects the operation. Then, the operation control unit 310 displays, on the operation unit 206, a main line environment selection screen including a main line environment list box, an execution button, a cancel button, and a skip button. If the user selects one option from among options in the main line environment list box and presses the execution button, the operation control unit 310 detects the operation. The operation control unit 310 then transmits information indicating a selection result, to the security setting control unit 330, and displays a sub line environment selection screen on the operation unit 206. If the user presses the skip button on the main line environment selection screen, the operation control unit 310 detects the operation and displays the sub line environment selection screen on the operation unit 206. The sub line environment selection screen is a screen that includes a sub line environment list box, an execution button, and a cancel button. If the user selects one option from among options in the sub line environment list box and presses the execution button, the operation control unit 310 detects the operation. The operation control unit 310 then transmits information indicating a selection result, to the security setting control unit 330. If the user presses the cancel button when the main line environment selection screen or the sub line environment selection screen is displayed, the operation control unit 310 detects the operation. The operation control unit 310 then displays a menu screen (not illustrated) on the operation unit 206, and ends the collective setting function. Based on the information indicating a selection result that has been received from the operation control unit 310, the security setting control unit 330 makes a collective setting for at least one of the main line and the sub line. In this example, the description has been given of an example case where a screen transitions from the main line environment selection screen to the sub line environment selection screen after a setting operation or a setting cancel operation of a main line environment is received on the main line environment selection screen. Nevertheless, the configuration is not limited to this. For example, a screen configuration can also be employed in which a main line environment is selectable on a setting screen for making a main line operation setting, and a sub line environment is selectable on a setting screen for making a sub line operation setting. In this case, the user can cause screen transition from a network setting screen (not illustrated) to a screen for performing an operation of each communication I/F, and associate an environment with a desired communication I/F.

The user also selects categories corresponding to the respective use environments of the main line and the sub line, on the setting screen 400. Nevertheless, some combinations of selected main line categories and sub line categories are inappropriate for the sake of convenience of classification of categories according to the present exemplary embodiment. For example, while the teleworking environment according to the present exemplary embodiment is an environment not under strict entry management, the Internet direct connection environment is an environment under strict entry management. Because one image forming apparatus cannot exist in both a location not under entry management and a location under entry management, this combination is considered to be inappropriate. As another example, the in-company intranet environment, the teleworking environment, and the public space environment cannot exist in a same location, thus three combinations, i.e., two environments out of these three environments, are all considered to be inappropriate.

A configuration of performing display control when the user selects such an inappropriate combination of categories can also be employed. More specifically, display control of displaying, on the operation unit 206, a warning message indicating the inappropriateness and prompting the user to review selection can be performed. Specifically, data of an inappropriate combination is stored into the data storage unit 320. If the user selects categories corresponding to the respective use environments of the main line and the sub line on the setting screen 400, the operation control unit 310 detects the operation. The operation control unit 310 then transmits information indicating a selection result, to the security setting control unit 330. Based on the received information and the data of the inappropriate combination that is stored in the data storage unit 320, the security setting control unit 330 determines whether the combination selected by the user is an inappropriate combination. In a case where the combination is inappropriate, the security setting control unit 330 displays a warning message on the operation unit 206 in cooperation with the operation control unit 310.

A configuration of performing display control if the user selects a use environment of either one of the main line and the sub line from among options in a list box can also be employed. More specifically, display control of presenting an option in another list box that forms the above-described inappropriate combination, to the user can be performed. Specifically, information indicating an environment inappropriate as a combination is stored into the data storage unit 320 for each environment. For example, as for the in-company intranet environment, the teleworking environment and the public space environment are stored as inappropriate environments with a flag being set thereto. If the user selects a main line use environment, the operation control unit 310 then brings an option of a use environment that forms an inappropriate combination with the main line use environment selected by the user, into a grayout state in the sub line environment list box 402. Specifically, if the operation control unit 310 detects that one environment has been selected from among the options in the main line environment list box 401, the operation control unit 310 refers to a flag stored in the data storage unit 320, and identifies an environment inappropriate as a combination with the selected environment. The operation control unit 310 performs control in such a manner as to display the identified inappropriate environment in a grayout state in the sub line environment list box 402. In contrast, in a case where the user selects a sub line use environment, the operation control unit 310 similarly brings an option of an inappropriate use environment into a grayout state in the main line environment list box 401. Specific processing is similar to processing performed in a case where the user selects a main line use environment.

In the present exemplary embodiment, the same environment is made selectable as a main line environment and a sub line environment, but display can be performed in such a manner that the same environment is unselectable. Specifically, it is sufficient that, as for a certain environment, the environment is stored into the data storage unit 320 as an environment inappropriate as a combination.

A determination method of a category corresponding to a use environment of the image forming apparatus 101 according to the present exemplary embodiment is a method of prompting the user to select an option of a category itself, but the determination method is not limited to this. For example, a configuration of displaying a question that is based on a category classification condition, and prompting the user to select an answer thereto may be employed. Hereinafter, examples of questions that are based on a category classification condition will be given. Firstly, the operation control unit 310 displays a question "Is it an environment where highly-confidential information is handled?" on the operation unit 206. Based on an answer to the question, the security setting control unit 330 determines whether the use environment is a highly-confidential information management environment. Subsequently, the operation control unit 310 displays a question "Is it an environment under strict entry management?" on the operation unit 206. If an answer to the question is "Yes", the security setting control unit 330 determines that the use environment is the in-company intranet environment, the Internet direct connection environment, or the Internet-prohibited environment. If an answer to the question is "No", the security setting control unit 330 determines that the use environment is the teleworking environment or the public space environment. In a case where an answer to a question regarding entry management is "No", the operation control unit 310 displays a question "Do unspecified users use a network in common?" on the operation unit 206. If an answer to the question is "Yes", the security setting control unit 330 determines that the use environment is the public space environment. If the answer to the question is "No", the security setting control unit 330 determines that the use environment is the teleworking environment. In a case where an answer to a question regarding entry management is "Yes", the operation control unit 310 displays a question "Is it an environment where an apparatus is directly connected to the Internet?" on the operation unit 206. If an answer to the question is "Yes", the security setting control unit 330 determines that the use environment is the in-company intranet environment or the Internet direct connection environment. If the answer to the question is "No", the security setting control unit 330 determines that the use environment is the Internet-prohibited environment. If an answer to the question is "Yes", the operation control unit 310 lastly displays a question "Is it an environment where a firewall is installed?" on the operation unit 206. In a case where an answer to the question is "Yes", the security setting control unit 330 determines that the use environment is the in-company intranet environment. In a case where the answer to the question is "No", the security setting control unit 330 determines that the use environment is the Internet direct connection environment.

In the above description, a category is selected by a user operation, but the configuration is not limited to this. A configuration in which the CPU 201 of the image forming apparatus 101 executes processing of estimating a category corresponding to a use environment of the image forming apparatus 101, and a setting that is based on the estimation result is made can also be employed. The configuration will be specifically described. Firstly, the CPU 201 executes estimation processing using operation setting information regarding a network, such as an IP address of the image forming apparatus 101, a gateway address, and a dynamic host configuration protocol (DHCP) server address. By executing the estimation processing, an estimation result of an estimated use environment corresponding to each communication I/F is obtained. Subsequently, the CPU 201 transmits information indicating the estimation result, to the security setting control unit 330. After receiving the information indicating the estimation result, the security setting control unit 330 lastly makes a setting based on the received estimation result.

<Collective Setting Processing for Main Line and Sub Line>

Collective setting processing for the main line and the sub line will now be described with reference to FIG. 5. Each operation (step) illustrated in a flowchart in FIG. 5 is implemented by the CPU 201 loading and executing a program for implementing each control unit that is stored in the ROM 202 or the HDD 204, onto the RAM 203.

Figure 5:
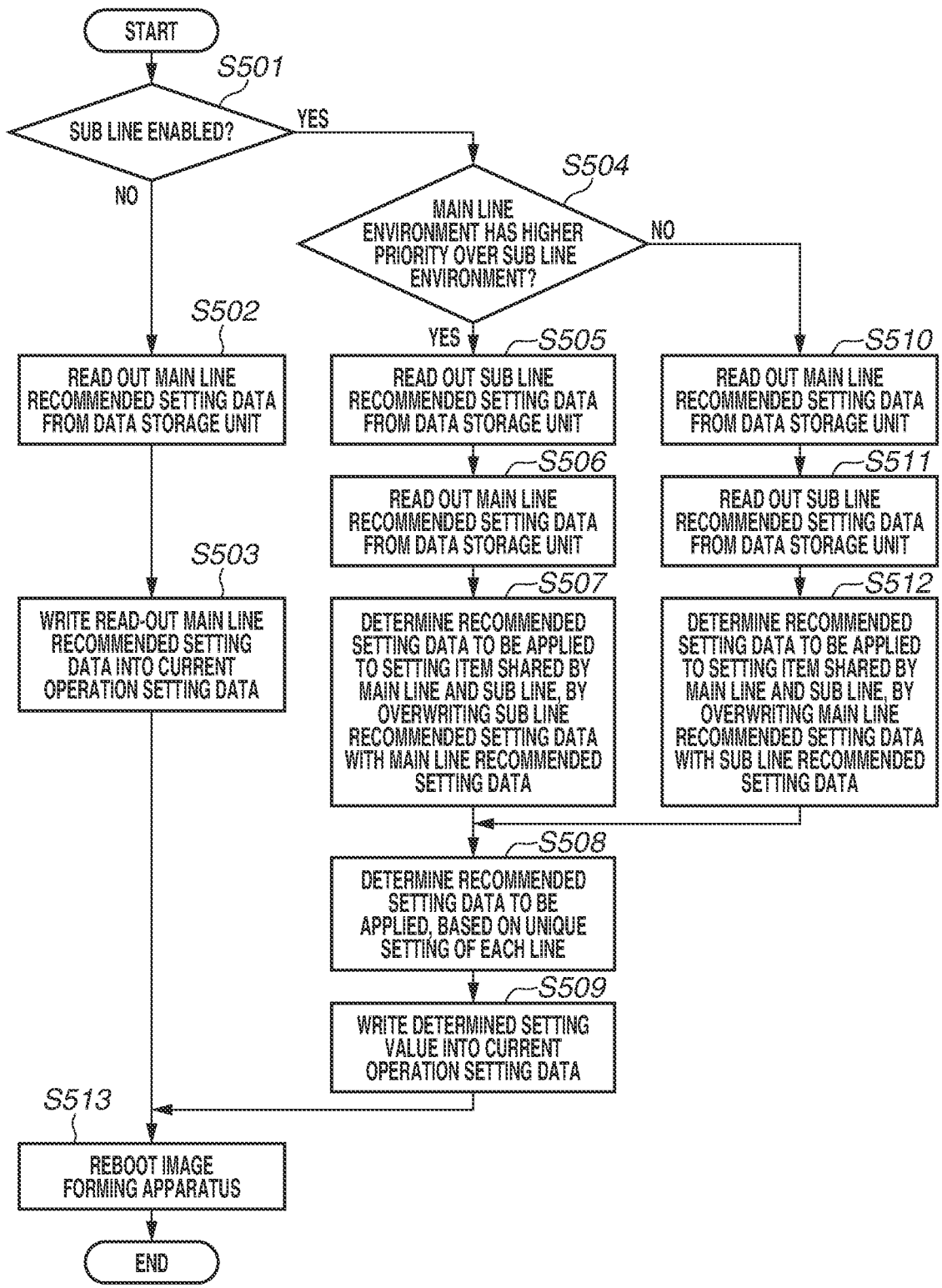
FIG. 5 is a flowchart illustrating an example of collective setting processing to be executed by the image forming apparatus.

The processing illustrated in FIG. 5 is started upon the operation control unit 310 detecting operations of selecting the respective use environments of the main line and the sub line, and a press operation of the execute button 403, which are performed by the user, and transmitting information indicating a selection result, to the security setting control unit 330.

In step S501, the security setting control unit 330 determines whether a sub line is enabled. The state in which a sub line is enabled refers to a state in which a main line and a sub line are concurrently used. The state in which a sub line is disabled refers to a state in which only one communication I/F is used.

In a case where a sub line is enabled (YES in step S501), the processing proceeds to step S504. In a case where a sub line is not enabled (NO in step S501), the processing proceeds to step S502. In a case where a sub line is not enabled, a collective setting is made only for the main line. For this reason, in step S502, the security setting control unit 330 reads out recommended setting data stored in association with a category selected by the user, from the main line recommended setting value database 321 stored in the data storage unit 320. In step S503, the recommended setting data is applied to a setting for the main line. Specifically, the recommended setting data is written into the current operation setting data 324. As described above, in the present exemplary embodiment, as for a setting item for which False is stored as a boolean value, a setting value is not changed, and a setting value of a setting item for which True is stored is changed.

In a case where a sub line is enabled, processing of determining a collective setting value for the main line and the sub line is performed by using the main line recommended setting value database 321 and the sub line recommended setting value database 322. A setting value is determined in such a manner that a category to be prioritized is selected out of a main line category and a sub line category that have been selected by the user, and recommended setting data of the selected category is preferentially set.

In step S504, the security setting control unit 330 selects a category to be prioritized, using the category priority order database 323 stored in the data storage unit 320. Specifically, the security setting control unit 330 determines which of a category selected as a main line environment and a category selected as a sub line environment has a higher priority. In a case where a category selected as a main line environment has a higher priority over a category selected as a sub line environment (YES in step S504), the processing proceeds to step S505. In a case where a category selected as a sub line environment has a higher priority over a category selected as a main line environment (NO in step S504), the processing proceeds to step S510.

In step S505, the security setting control unit 330 reads out recommended setting data stored in association with a sub line category selected by the user, from the sub line recommended setting value database 322 stored in the data storage unit 320. In step S506, the security setting control unit 330 reads out recommended setting data stored in association with the main line category selected by the user, from the main line recommended setting value database 321 stored in the data storage unit 320. In steps S507 and S508, the security setting control unit 330 determines recommended setting data to be applied, using a setting value group associated with the sub line category that has been read out in step S505, and a setting value group associated with the main line category that has been read out in step S506. A specific determination method of recommended setting data to be applied will be described below. As described above with reference to Table 2, setting items according to the present exemplary embodiment include a setting item shared by the main line and the sub line, a setting item unique to the main line, and a setting item unique to the sub line. In step S507, the security setting control unit 330 determines recommended setting data to be applied to a setting shared by the main line and the sub line. Specifically, the security setting control unit 330 determines recommended setting data to be applied, by overwriting sub line recommended setting data, which is a setting value group read out in step S505, with main line recommended setting data, which is a setting value group read out in step S506. In the overwriting, similarly to the above-described writing into the current operation setting data 324, a setting value is not changed as for a setting item for which False is stored as a boolean value, and a setting value of a setting item for which True is stored is changed. In step S508, the security setting control unit 330 determines recommended setting data to be applied, based on a setting unique to each line. Specifically, the security setting control unit 330 extracts a setting item unique to each line, and a setting value corresponding to the setting item, from the recommended setting data of the respective lines that have been read out in steps S505 and S506, and determines the extracted data as recommended setting data to be applied to a setting unique to each line. Specific examples of recommended setting data determined by the above-described processing in steps S505 to S508 is listed in Table 4.

TABLE 4

| | | | Main line environment selection result In-company intranet type Priority 2 | Sub line environment selection result Internet direct connection type Priority 3 |
|---|---|---|---|---|
| Settings shared by main line and sub line | Setting regarding communication path encryption | TLS setting | On | On |
| | Setting regarding legacy protocol | WINS setting | Off | Off |
| | Setting regarding authentication safety | Caching of authentication password of external server | Prohibited | Prohibited |
| | | Setting of minimum number of characters of password | Eight characters | Eight characters |
| | Setting regarding physical attack countermeasure | Job erasing setting | | |
| | Setting regarding file sharing function | SMB server setting | | Off |
| | Setting regarding external storage device | Use of USB external storage device | Off | Off |
| Setting unique to main line | Setting regarding personal firewall for main line | Default policy of IP address filter of main line | | |
| | | Exception address of IP address filter of main line | | |
| Setting unique to sub line | Setting regarding personal firewall for sub line | Default policy of IP address filter of sub line | | Denied |
| | | Exception address of IP address filter of sub line | | Subnet address of image forming apparatus of sub line |
| | | | | Recommended setting data to be applied that has been determined by processing in steps S507 and S508 |
| Settings shared by main line and | Setting regarding communication path encryption | TLS setting | On | |

TABLE 4-continued

| | | | |
|---|---|---|---|
| sub line | Setting regarding legacy protocol | WINS setting | Off |
| | Setting regarding authentication safety | Caching of authentication password of external server | Prohibited |
| | | Setting of minimum number of characters of password | Eight characters |
| | Setting regarding physical attack countermeasure | Job erasing setting | |
| | Setting regarding file sharing function | SMB server setting | Off |
| | Setting regarding external storage device | Use of USB external storage device | Off |
| Setting unique to main line | Setting regarding personal firewall for main line | Default policy of IP address filter of main line | |
| | | Exception address of IP address filter of main line | |
| Setting unique to sub line | Setting regarding personal firewall for sub line | Default policy of IP address filter of sub line | Denied |
| | | Exception address of IP address filter of sub line | Subnet address of image forming apparatus of sub line |

A determination method of setting data to be applied is not limited to the overwriting processing in steps S505 to S508. For example, setting data may be determined by extracting a setting value of a setting item shared by the main line and the sub line from recommended setting data of a category with a higher priority, and extracting setting values of setting items unique to the main line and the sub line from recommended setting data of the respective selected categories.

If the security setting control unit 330 determines setting data to be applied, in steps S507 and S508, the processing proceeds to step S509. In step S509, the security setting control unit 330 writes the determined setting data into the current operation setting data 324.

In a case where the security setting control unit 330 determines in step S504 that a category selected as a sub line environment has a higher priority than a category selected as a main line environment (NO in step S504), the processing proceeds to step S510. In step S510, the security setting control unit 330 reads out recommended setting data stored in association with the main line category selected by the user, from the main line recommended setting value database 321 stored in the data storage unit 320. In step S511, the security setting control unit 330 reads out recommended setting data stored in association with the sub line category selected by the user, from the sub line recommended setting value database 322 stored in the data storage unit 320. In steps S512 and S508, the security setting control unit 330 determines recommended setting data to be applied, using the recommended setting data of the respective lines that have been read out in steps S510 and S511. The processing in step S512 is processing in which the main line and the sub line in the processing in step S507 are swapped. More specifically, the security setting control unit 330 determines recommended setting data to be applied, by overwriting the main line recommended setting data read out in step S510, with the sub line recommended setting data read out in step S511, for a setting item shared by the main line and the sub line. The processing then proceeds to step S508, and the security setting control unit 330 determines recommended setting data to be applied, based on a setting unique to each line, as described above. Specifically, the security setting control unit 330 extracts a setting item unique to each line, and a setting value corresponding to the setting item, from the recommended setting data of the respective lines that have been read out in steps S510 and S511, and determines the extracted data as recommended setting data to be applied to a setting unique to each line. In step S509, the security setting control unit 330 writes the recommended setting data determined in steps S512 and S508, into the current operation setting data 324.

Lastly, in step S513, the security setting control unit 330 reboots the image forming apparatus 101. If the image forming apparatus 101 is rebooted, the rewritten current operation setting data 324 is read out by a program, and the program operates with a rewritten new setting. In this manner, the applied setting is reflected in an operation of the image forming apparatus 101.

In the present exemplary embodiment, priority orders of a category selected as a main line environment and a category selected as a sub line environment are determined based on the category priority order database 323. Then, recommended setting data of a line associated with a category with a low priority order is overwritten with recommended setting data of a line associated with a category with a high priority order. With such a configuration, recommended setting data of a line associated with a category with a high priority order can be preferentially written into the current operation setting data 324. For example, in a case where there are an environment in which eight characters are set as the minimum number of characters of a password, which is one of setting items, and an environment in which ten characters are set as the minimum number of characters of a password, and a priority order of the environment with ten characters is higher than the priority order of the environment with eight characters, setting data to be applied can be determined to be ten characters by performing the overwriting processing of the present exemplary embodiment.

By performing the above-described processing, it is possible to collectively make settings of the information processing apparatus by the user selecting a category corresponding to each line, in an information processing apparatus including a main line and a sub line.

In the present exemplary embodiment, the description has been given of a configuration of collectively setting both a shared setting and a unique setting using a recommended setting value database including both a setting item shared by the main line and the sub line, and setting items unique to the main line and the sub line. Nevertheless, the configuration is not limited to this. A configuration of collectively setting only setting items unique to the main line and the sub line, or a configuration of collectively setting only setting items shared by the main line and the sub line can also be employed. In the present exemplary embodiment, the number of setting items unique to the main line and the sub line is one, and only a setting regarding a personal firewall is provided, but a plurality of unique setting items may be provided.

In a case where only setting items unique to the main line and the sub line are collectively set, a recommended setting value database including only setting items unique to the main line and the sub line is firstly stored into the data storage unit 320.

In this case, the category priority order database 323 needs not be stored. A recommended setting value corresponding to the setting item unique to the main line is applied to a setting for the main line, and a recommended setting value corresponding to the setting item unique to the sub line is applied to a setting for the sub line.

Furthermore, in the first exemplary embodiment, a part of operation settings described as operation settings shared by the main line and the sub line can also be managed as an operation setting unique to each line. For example, an operation setting regarding a protocol can be provided as a setting item unique to each line. More specifically, a setting regarding communication path encryption, a setting regarding a legacy protocol, and a setting regarding the file sharing function, which are exemplified in Table 2, may be managed as operation settings unique to each line. In this case, in a case where communication regarding the protocol occurs, an information processing apparatus refers to a unique operation setting set for each line, and performs communication control for the protocol. For example, the description will be given of a collective setting in an example case where an in-company intranet type is selected as a category corresponding to the main line, and an Internet direct connection type is selected as a category corresponding to the sub line. For the sake of explanatory convenience, the description will be given of an example case where both an SMB server setting unique to the main line and an SMB server setting unique to the sub line are set to "On" as current operation settings of the information processing apparatus. In a case where the above-described operation settings are set, if a collective setting including a combination of the above-described line and a category is executed, it is possible to set the SMB server setting unique to the sub line, to "Off" while keeping the SMB server setting unique to the main line, at "On". In this case, in communication executed via the main line, the file sharing function can be used as used to be, and in communication executed via the sub line, the file sharing function can be made unusable.

In contrast, in a case where only setting items shared by the main line and the sub line are collectively set, a recommended setting value database including only setting items shared by the main line and the sub line is firstly stored into the data storage unit 320. Then, setting data to be applied is determined using the category priority order database 323 and applied to the setting of the information processing apparatus as described above.

Modified Example 1

In the above-described exemplary embodiment, environments in which an information processing apparatus, such as an image forming apparatus, is used are classified into six categories corresponding to the in-company intranet environment, the Internet direct connection environment, the Internet-prohibited environment, the teleworking environment, the public space environment, and the highly-confidential information management environment. Nevertheless, classification is not limited to this. Categories may be classified by security level staged based on a security policy from the user. Hereinafter, an example of classifying categories by security level will be described. A hardware configuration and a software configuration of the image forming apparatus 101 are similar to those in the first exemplary embodiment, the description will be omitted.

For example, in a case where no security policy is set, a security level is set to 0. In a case where protection of authority of an administrator is set as a security policy, a security level is set to 1. In a case where the restriction of use range is set as a security policy, a security level is set to 2. In a case where the prevention of leakage of personal information is set as a security policy, a security level is set to 3. In this manner, a security level is staged by security policies. A staged security level or a security policy corresponding to a security level serves as a category in this modified example. There has been known a function of applying a security policy defined by an organization, to an image forming apparatus, and prohibiting a setting of a specific security setting item from changing to a setting unsuitable for the security policy. This modified example is an example of applying the present invention to this function. In the first exemplary embodiment, a user, such as an administrator, can change a setting value of an individual setting item to another setting value again via an individual setting change screen (not illustrated) in accordance with an actual use situation, even in a case where the user has performed a collective setting. However, in this modified example, such a change cannot be performed. Also in such a configuration, the present invention can be applied. Hereinafter, specific description will be given.

Similarly to the main line recommended setting value database 321 and the sub line recommended setting value database 322, a setting data group including a combination of a setting item of a security function and a recommended setting value for each category is stored into the data storage unit 320. The category priority order database 323 may be omitted by using a numerical value itself of a security level as a priority order.

If the user performs an operation to display a setting screen, on a menu screen, the operation control unit 310 detects the operation and displays a setting screen on the operation unit 206. On the setting screen, list boxes each including staged security levels or security policies corresponding to security levels, as options are displayed respectively for the main line and the sub line. The list box will be referred to as a main line list box or a sub line list box. An execution button similar to the execute button 403 in FIG. 4 is also displayed. If the user selects a security level suitable for the main line, from among the options in the main line list box, selects a security level suitable for the sub line, from among the options in the sub line list box, and presses the execution button, the operation control unit 310 detects the operation. The operation control unit 310 transmits information indicating a result of selection made by the user, to the security setting control unit 330. The security setting control unit 330 collectively makes security function settings suitable for the security levels selected by the user. The collective setting processing is similar to the processing illustrated in FIG. 5, and thus the description will be omitted.

By using the above-described processing, in an information processing apparatus including a main line and a sub line, a collective setting suitable for the security policy can be made for each line by designating a security level that is based on a security policy for each line.

Modified Example 2

In the first exemplary embodiment, a configuration has been described of selecting a use environments suitable for two lines corresponding to a main line and a sub line, and making a setting. Nevertheless, the configuration is not limited to this.

As described above, the image forming apparatus 101 includes the first wired communication I/F 211, the second wired communication I/F 212, and the wireless communication I/F 213. Also in a case where such three or more lines are concurrently used, the present invention can be applied.

For example, three lines will be referred to as a main line, a sub line 1, and a sub line 2. On the setting screen 400, a main line environment list box, a sub line 1 environment list box, a sub line 2 environment list box, and an execution button are displayed. Options in the list boxes are similar to those in the first exemplary embodiment. If the user selects use environments suitable for the respective lines, from among options in the three list boxes, and presses the execution button, the operation control unit 310 detects the operation. The operation control unit 310 transmits information indicating a result of selection made by the user, to the security setting control unit 330. The security setting control unit 330 makes security function settings suitable for the selected use environments received from the operation control unit 310.

The data storage unit 320 stores the category priority order database 323 and the current operation setting data 324 similarly to the first exemplary embodiment. The data storage unit 320 further stores a main line recommended setting database, a sub line 1 recommended setting database, and a sub line 2 recommended setting database.

The processing of security setting control follows the processing described in the first exemplary embodiment with reference to FIG. 5. Specifically, the security setting control unit 330 determines whether the sub line 1 is enabled or whether the sub line 2 is enabled. In a case where both the sub line 1 and the sub line 2 are disabled, the processing in steps S502, S503, and S513 is performed. In a case where the sub line 1 is enabled and the sub line 2 is disabled, the processing similar to that in the first exemplary embodiment is performed. In a case where both the sub line 1 and the sub line 2 are enabled, the security setting control unit 330 performs the following processing. The security setting control unit 330 firstly determines priority orders of three categories selected as the respective environments of the main line, the sub line 1, and the sub line 2 by using the category priority order database 323. The security setting control unit 330 then overwrites recommended setting data of a line associated with a category with the lowest priority order, with recommended setting data of a line associated with a category with the second lowest priority order. Subsequently, the security setting control unit 330 determines setting data to be applied, by overwriting the overwritten data with recommended setting data of a line associated with a category with the highest priority order. Lastly, the security setting control unit 330 writes the determined setting data into the current operation setting data 324, and reboots the image forming apparatus 101.

By employing the above-described processing, also in a case where the image forming apparatus 101 concurrently uses three lines, it is possible to set recommended setting values of environments that are suitable for the respective three lines. By performing processing following this, it is also possible to make settings for four or more lines.

In the first exemplary embodiment, as for a setting item shared by the main line and the sub line, recommended setting data to be applied is automatically determined based on priorities of a main line environment and a sub line environment, but the user cannot manually set recommended setting data to be applied.

In a second exemplary embodiment, as for a setting item shared by the main line and the sub line, which recommended setting data of main line recommended setting data and sub line recommended setting data is to be set is made selectable using an operation unit at the time of initial installation. The user sets either main line recommended setting data or sub line recommended setting data.

Figure 6:
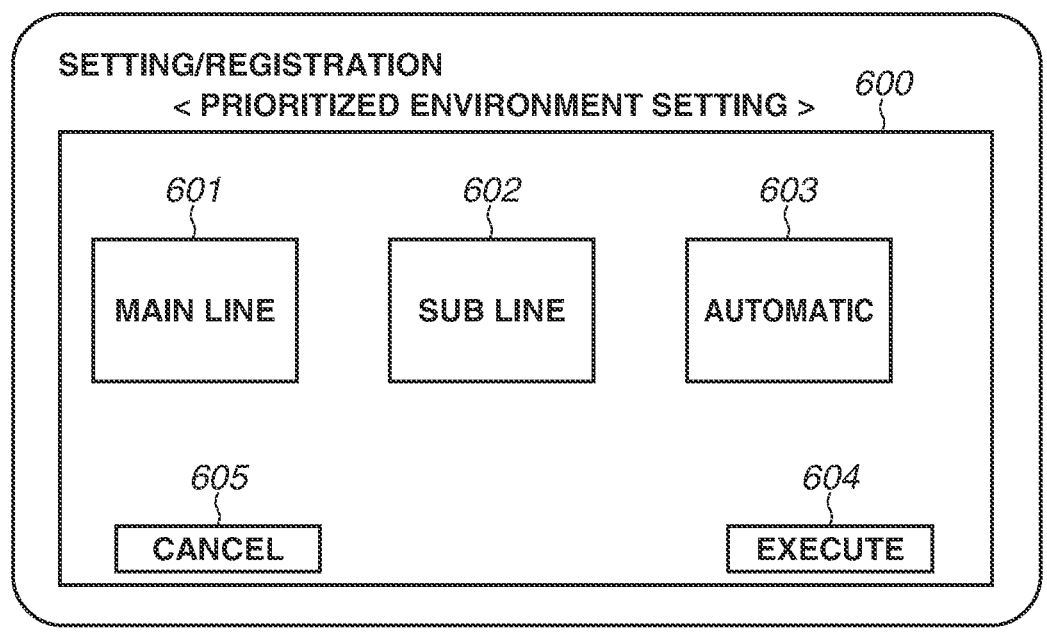
FIG. 6 is a diagram illustrating an example of a screen to be displayed on an operation unit of an image forming apparatus according to a second exemplary embodiment.

A setting screen 600 to be displayed on the operation unit 206 of the image forming apparatus 101 will be described with reference to FIG. 6. In the present exemplary embodiment, the setting screen 600 to be displayed on the operation unit 206 of the image forming apparatus 101 will be described, but the setting screen is not limited to this. For example, a web page similar to the setting screen 600 can be provided to a web browser of an external information processing apparatus using the web UI control unit 340, and a setting operation can be performed via the web page.

The setting screen 600 is a screen to be displayed by the operation control unit 310 on the operation unit 206. If the user operates to display the setting screen 600, on a menu screen (not illustrated), the operation control unit 310 detects the operation and displays the setting screen 600. A main line button 601 is a region for the user selecting a main line as a prioritized line. A sub line button 602 is a region for the user selecting a sub line as a prioritized line. Automatic button 603 is a region for automatically determining a line to be prioritized, out of the main line and the sub line as in the first exemplary embodiment. The user then operates to press an execute button 604. The operation control unit 310 of the image forming apparatus 101 detects an operation performed by the user, and transmits information indicating a result of selection made by the user, to the security setting control unit 330. The security setting control unit 330 reflects a setting selected by the user and received from the operation control unit 310, in an operation. A cancel button 605 is a button for not reflecting the setting. If the cancel button 605 is pressed, a menu screen (not illustrated) is displayed, and the display of the setting screen 600 is ended.

Collective setting processing for the main line and the sub line will now be described with reference to FIG. 7. Each operation (step) illustrated in a flowchart in FIG. 7 is implemented by the CPU 201 loading a program for implementing each control unit that is stored in the ROM 202 or the HDD 204, onto the RAM 203, and executing the program.

Figure 7:
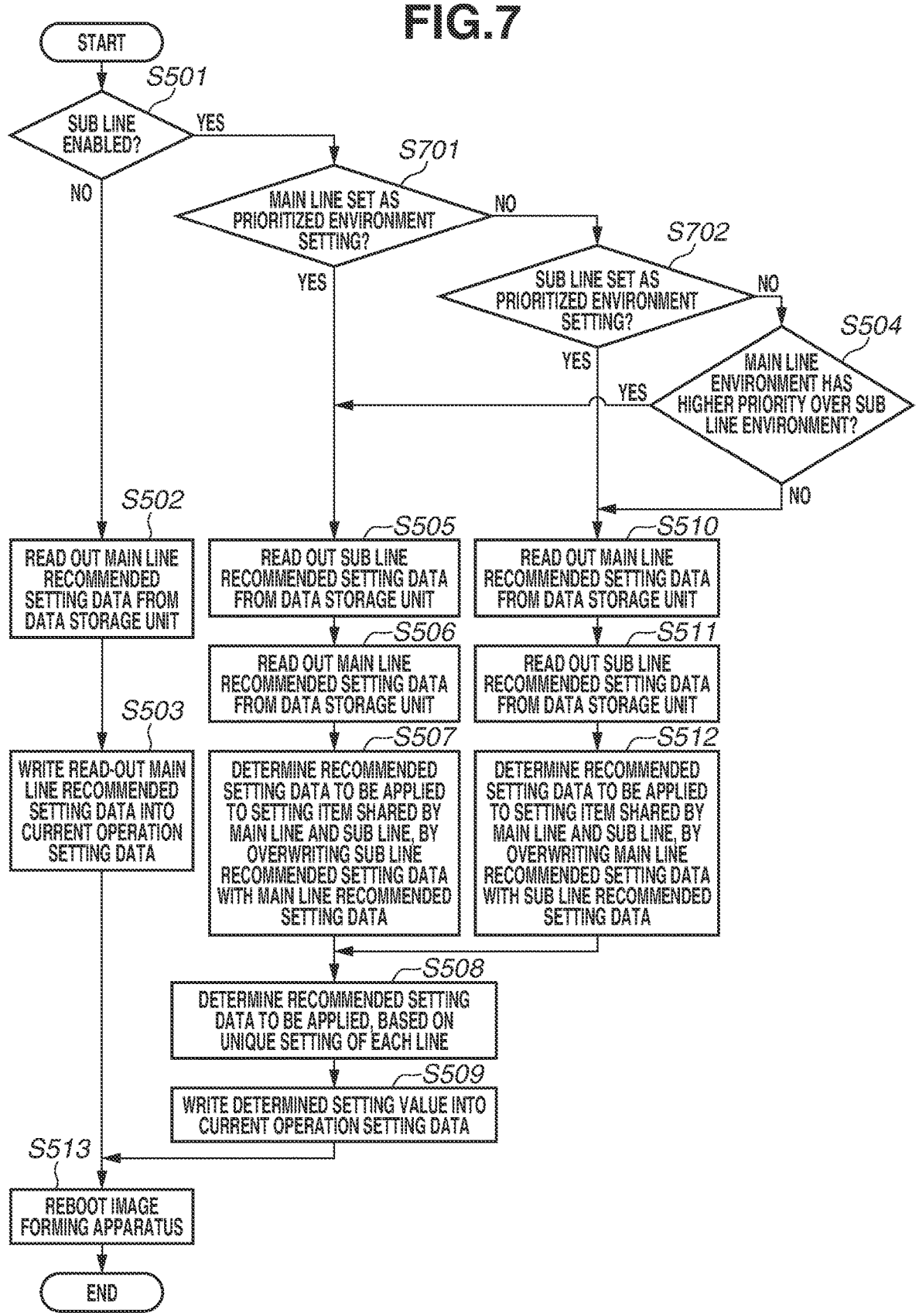
FIG. 7 is a flowchart illustrating an example of collective setting processing to be executed by the image forming apparatus according to the second exemplary embodiment.

The processing illustrated in FIG. 7 is started upon the operation control unit 310 detecting operations of selecting the respective use environments of the main line and the sub line, and a press operation of the execute button 403, which are performed by the user on the setting screen 600, and transmitting information indicating a selection result, to the security setting control unit 330.

The processing in steps S501 to S513 is similar to the processing in FIG. 5. In step S701, the security setting control unit 330 determines whether a main line has been set on the setting screen 600 in FIG. 6 as a prioritized environment setting. In a case where a main line has been set as a prioritized environment setting (YES in step S701), the processing proceeds to step S505. In a case where a main line has not been set as a prioritized environment setting (NO in step S701), the processing proceeds to step S702. In step S702, the security setting control unit 330 determines whether a sub line has been set on the setting screen 600 in FIG. 6 as a prioritized environment setting. In a case where a sub line has been set as a prioritized environment setting (YES in step S702), the processing proceeds to step S510. In a case where a sub line has not been set as a prioritized environment setting (NO in step S702), the processing proceeds to step S504. The processing in step S504 and subsequent steps is similar to the processing in FIG. 5.

With the above-described configuration, the user can manually select recommended setting data to be applied, as for a setting item shared by the main line and the sub line.

In the first exemplary embodiment, as for a setting item shared by the main line and the sub line, recommended setting data to be applied is automatically determined based on priorities of a main line environment and a sub line environment. In the first exemplary embodiment, when a state in which only the main line is enabled is changed to a state in which the sub line is also enabled afterward, a setting value of the main line that is undesired to be changed is also changed in some cases. This may prevent communication via the main line.

In a third exemplary embodiment, when only a main line is set at the time of initial installation and a sub line is set afterward, only a setting unique to the sub line is made without making a setting shared by the main line and the sub line in order to avoid affecting communication via the main line.

Collective setting processing for the main line and the sub line will be described with reference to FIG. 8. Each operation (step) illustrated in a flowchart in FIG. 8 is implemented by the CPU 201 loading a program for implementing each control unit that is stored in the ROM 202 or the HDD 204, onto the RAM 203, and executing the program.

Figure 8:
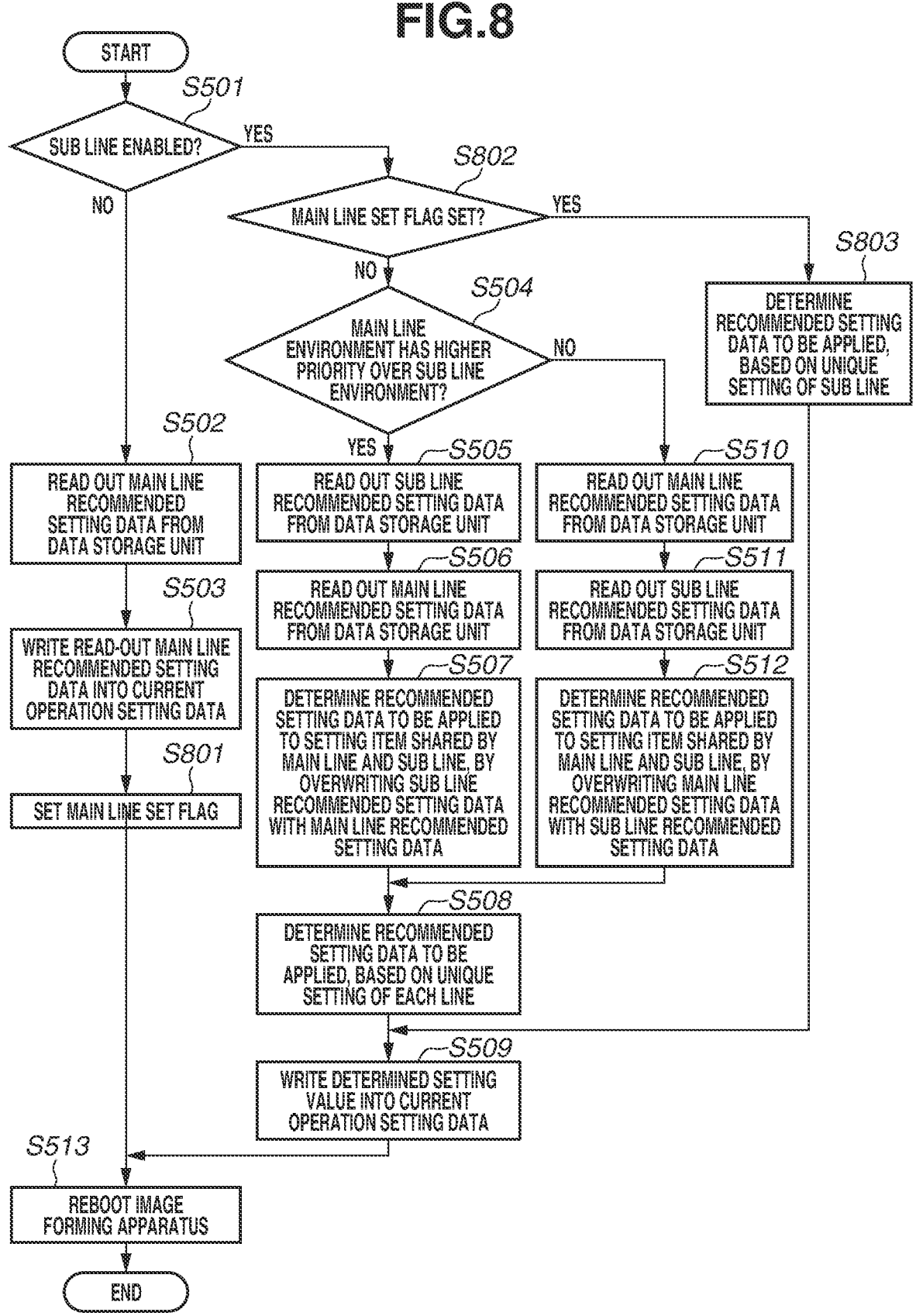
FIG. 8 is a flowchart illustrating an example of collective setting processing to be executed by an image forming apparatus according to a third exemplary embodiment.

The processing illustrated in FIG. 8 is started upon the operation control unit 310 detecting operations of selecting the respective use environments of the main line and the sub line and a press operation of the execute button 403, which are performed by the user on the setting screen 400, and transmitting information indicating a selection result, to the security setting control unit 330.

The processing in steps S501 to S503 is similar to the processing in FIG. 5. In step S801, the security setting control unit 330 sets a main line set flag. In step S802, the security setting control unit 330 determines whether the main line set flag is set. In a case where the main line set flag is set (YES in step S802), the processing proceeds to step S803. In a case where the main line set flag is not set (NO in step S802), the processing proceeds to step S504. In step S803, the security setting control unit 330 determines recommended setting data to be applied, based on a setting unique to the sub line, and the processing proceeds to step S509. Specific processing in step S803 is similar to the determination method of recommended setting data of a setting unique to the sub line in step S508. The processing in steps S505 to S513 is similar to the processing in FIG. 5.

With the above-described configuration, when a state in which only the main line is enabled is changed to a state in which the sub line is also enabled afterward, only a setting unique to the sub line can be changed to a setting suitable for an environment, without changing a setting value of the main line that is undesired to be changed.

In the first exemplary embodiment, as for a setting item shared by the main line and the sub line, recommended setting data to be applied is automatically determined based on priorities of a main line environment and a sub line environment, but recommended setting data to be applied cannot be determined for each setting item.

In a fourth exemplary embodiment, as for a determination method of a setting value to be set to a setting item shared by the main line and the sub line, priority orders of environments are determined for each setting item, and a setting value of an environment with a higher priority order is set. For example, as for a TLS setting, priority orders are determined in the order of the highly-confidential information management environment, the public space environment, the teleworking environment, the Internet direct connection environment, the in-company intranet environment, and the Internet-prohibited environment. In contrast to this, as for a WINS setting, priority orders are determined in the order of the highly-confidential information management environment, the Internet direct connection environment, the public space environment, the Internet-prohibited environment, the teleworking environment, and the in-company intranet environment.

Figure 9:
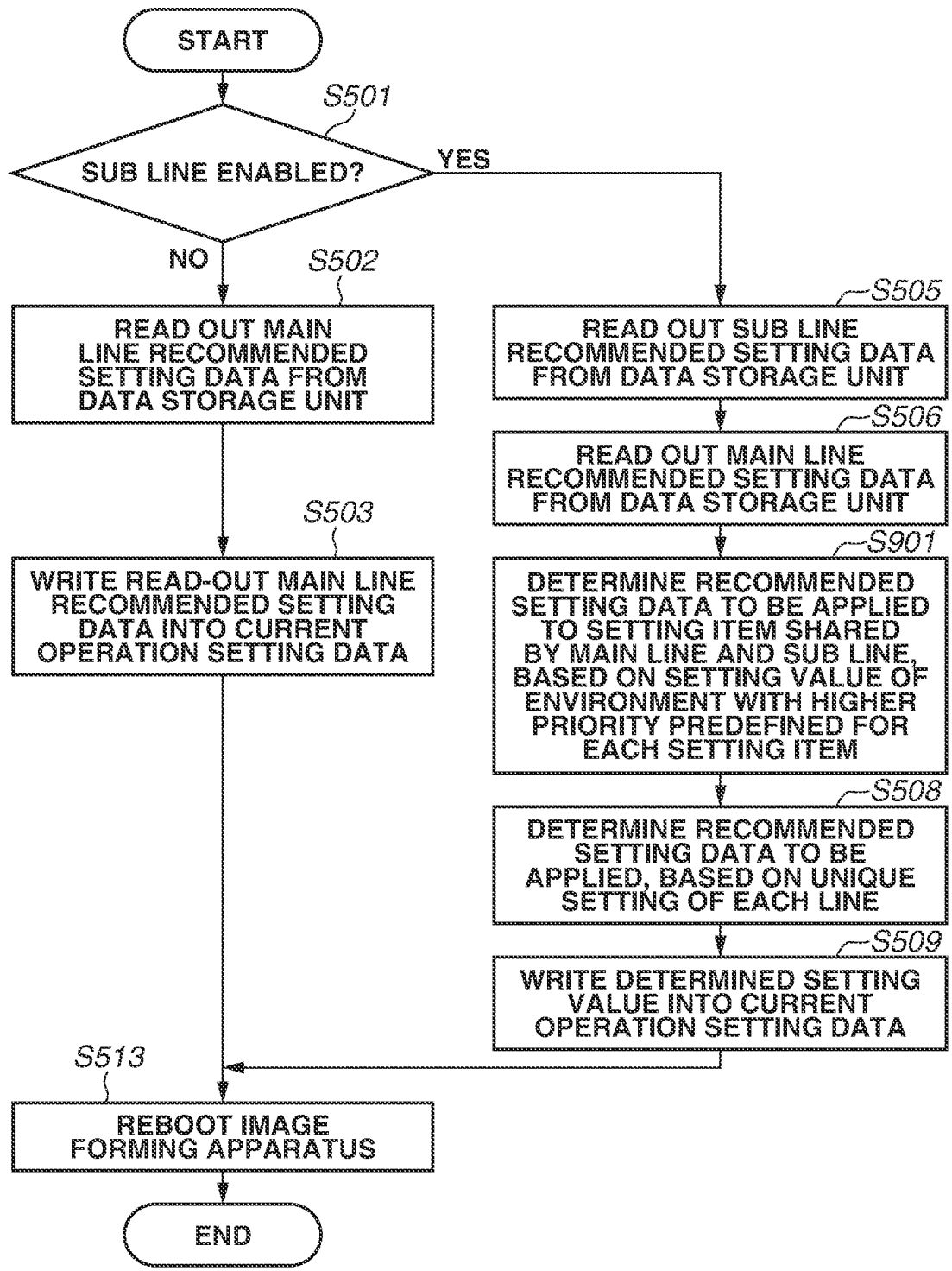
FIG. 9 is a flowchart illustrating an example of collective setting processing to be executed by an image forming apparatus according to a fourth exemplary embodiment.

Collective setting processing for the main line and the sub line will be described with reference to FIG. 9. Each operation (step) illustrated in a flowchart in FIG. 9 is implemented by the CPU 201 loading a program for implementing each control unit that is stored in the ROM 202 or the HDD 204, onto the RAM 203, and executing the program. The processing illustrated in FIG. 9 is started upon the operation control unit 310 detecting operations of selecting the respective use environments of the main line and the sub line and a press operation of the execute button 403, which are performed by the user on the setting screen 400, and transmitting information indicating a selection result to the security setting control unit 330.

The processing in steps S501 to S503 and the processing in steps S505 to S506 are similar to the processing illustrated in FIG. 5. The processing performed in steps S504, S507, and S510 to S512 is not executed. In step S901, the security setting control unit 330 determines, as for a setting item shared by the main line and the sub line, a setting value of an environment with a higher priority predefined for each setting item, as recommended setting data to be applied. The processing then proceeds to step S508.

For example, in the present exemplary embodiment, it is assumed that the in-company intranet environment is selected as a main line environment and the Internet-prohibited environment is selected as a sub line environment. In this case, according to the above-described priority orders for the TLS setting and the WINS setting, the in-company intranet environment is prioritized in the TLS setting, and the Internet-prohibited environment is prioritized in the WINS setting. Recommended setting values for each environment are similar to those in the first exemplary embodiment, and values in Table 2 are used. Thus, the TLS setting is set to "On" and a setting value of the WINS setting is not changed. Only a part of setting items have been described, but a setting value of each setting item is determined by a similar method.

With the above-described configuration, a setting of an environment with a higher priority can be applied for each setting item.

In the first exemplary embodiment, as for a setting item shared by the main line and the sub line, recommended setting data to be applied is automatically determined based on priorities of a main line environment and a sub line environment, but recommended setting data to be applied cannot be determined for each setting item. Thus, in the fourth exemplary embodiment, priority orders of environments are determined for each setting item, and recommended setting data of an environment with a higher priority order is applied.

In a fifth exemplary embodiment, as for a determination method of a setting value to be set to a setting item shared by the main line and the sub line, priority orders of setting values are determined for each setting item, and a setting value with a higher priority order is set. For example, "On" is prioritized for the TLS setting and "Off" is prioritized for the SMB server setting.

Collective setting processing for the main line and the sub line will be described with reference to FIG. 10. Each operation (step) illustrated in a flowchart in FIG. 10 is implemented by the CPU 201 loading a program for implementing each control unit that is stored in the ROM 202 or the HDD 204, onto the RAM 203, and executing the program.

Figure 10:
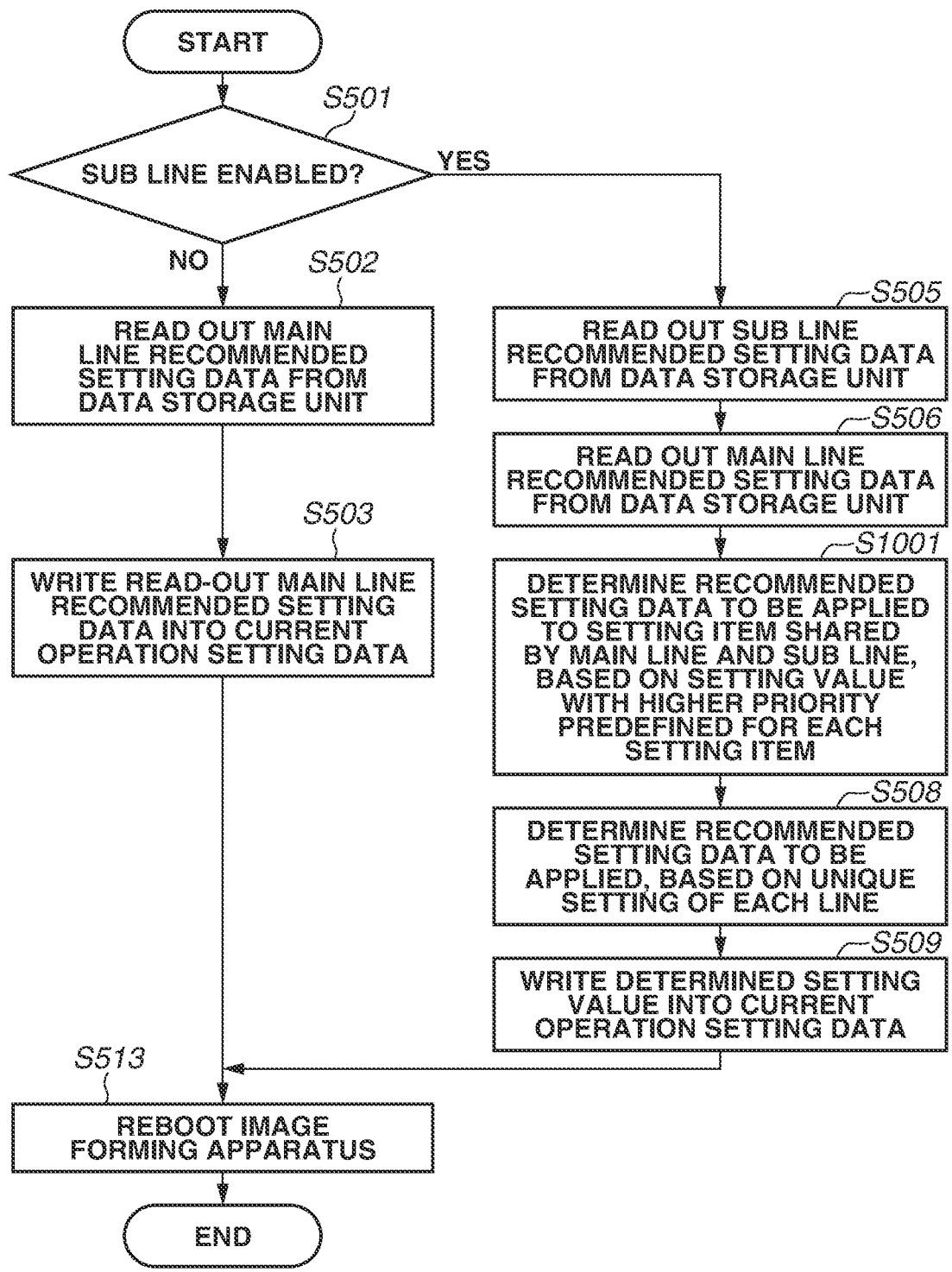
FIG. 10 is a flowchart illustrating an example of collective setting processing to be executed by an image forming apparatus according to a fifth exemplary embodiment.

The processing illustrated in FIG. 10 is started upon the operation control unit 310 detecting operations of selecting the respective use environments of the main line and the sub line and a press operation of the execute button 403, which are performed by the user on the setting screen 400, and transmitting information indicating a selection result to the security setting control unit 330.

The processing in steps S501 to S503 and the processing in steps S505 to S506 are similar to the processing illustrated in FIG. 5. The processing in steps S504, S507, and S510 to S512 is not executed. In step S1001, the security setting control unit 330 determines, as for a setting item shared by the main line and the sub line, a setting value with a higher priority predefined for each setting item, as recommended setting data to be applied. The processing then proceeds to step S508.

For example, in the present exemplary embodiment, it is assumed that the in-company intranet environment is selected as a main line environment and the Internet direct connection environment is selected as a sub line environment. Recommended setting values for each environment are similar to those in the first exemplary embodiment, and values in Table 2 are used. In this case, because a recommended setting value for the TLS setting is "On" in both of the in-company intranet environment and the Internet direct connection environment, "On" is determined as a setting value to be applied. As for the SMB server setting, a recommended setting value in the in-company intranet environment is not set, and a recommended setting value in the Internet direct connection environment is "Off". Because "Off" is prioritized in the above-described priority orders, "Off" is determined as a setting value to be applied to the SMB server setting. Only a part of setting items have been described, but a setting value of each setting item is determined by a similar method.

With the above-described configuration, it is possible to apply a setting value with a higher priority for each setting item.

An exemplary embodiment of the present invention can also be implemented by processing of supplying a program for implementing one or more functions of each of the above-described exemplary embodiments, to a system or an apparatus via a network or a storage medium, and one or more processors in a computer of the system or the apparatus reading out the program and executing the program. In addition, an exemplary embodiment of the present invention can also be implemented by a circuit for implementing one or more functions (for example, an application specific integrated circuit (ASIC) or a field programmable gate array (FPGA)).

According to an information processing apparatus according to an exemplary embodiment of the present invention, in an information processing apparatus including a plurality of communication interfaces, it is possible to collectively make settings suitable for use environments corresponding to the communication interfaces.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-004123, filed Jan. 14, 2022, and No. 2022-163765, filed Oct. 12, 2022, which are hereby incorporated by reference herein in their entirety.

What is claimed is:

1. An information processing apparatus storing a plurality of setting values and including a first communication interface and a second communication interface, the information processing apparatus comprising:
at least one memory which stores a computer program; and
at least one processor which executes the computer program to perform a process which comprises:
receiving, from a user, selection of a first item from among a first plurality of items corresponding to a plurality of use environments, as a first use environment corresponding to the first communication interface;
receiving, from a user, selection of a second item from among a second plurality of items corresponding to the plurality of use environments, as a second use environment corresponding to the second communication interface; and
performing setting processing based on a first setting value group and a second setting value group,
wherein the plurality of setting values includes the first setting value group corresponding to the first use environment and the second value group corresponding to the second user environment, and
wherein the setting processing includes setting of one or more setting values which are referred to both in processing using the first communication interface and in processing using the second communication interface.

2. The information processing apparatus according to claim 1, wherein the at least one processor further comprising:
displaying the first plurality of items for receiving selection of the first item and the second plurality of items for receiving selection of the second item,
wherein the second plurality of items is displayed so that a part of the second plurality of items is unselectable, based on the first item selected from among the first plurality of items.

3. The information processing apparatus according to claim 2, wherein the part of the second plurality of items displayed to be unselectable is displayed in a grayout state.

4. The information processing apparatus according to claim 1, wherein the at least one processor further comprising:
determining either the first setting value group or the second setting value group to be used for the setting of the one or more setting values which are referred to both in processing using the first communication interface and in processing using the second communication interface.

5. The information processing apparatus according to claim 4, wherein the at least one processor further comprising:
receiving, from a user, selection of a communication interface to be prioritized, from among the first communication interface and the second communication interface,
wherein a setting value group corresponding to a use environment corresponding to the selected communication interface is determined to be used for the setting of the one or more setting values which are referred to both in processing using the first communication interface and in processing using the second communication interface.

6. The information processing apparatus according to claim 1,
wherein one or more setting values to be prioritized are stored respectively for one or more setting items of which the setting values are referred to both in processing using the first communication interface and in processing using the second communication interface, and
wherein based on the first setting value group and the second setting value group, the one or more setting values to be prioritized are set for the one or more setting items of which the setting value are referred to both in processing using the first communication interface and in processing using the second communication interface.

7. The information processing apparatus according to claim 1, wherein the one or more setting values which are referred to both in processing using the first communication interface and in processing using the second communication interface including a setting value of a setting item regarding encryption of a communication path, a legacy protocol, safety of authentication, a physical attack countermeasure, a file share function, or an external storage device.

8. The information processing apparatus according to claim 1,
wherein in the setting processing,
a filtering condition regarding the first communication interface is set in such a manner as to permit communication from a first address range corresponding to a subnet of a network to which the first communication interface belongs, and to deny communication from an address range falling outside the first address range, and
a filtering condition regarding the second communication interface is set in such a manner as to permit communication from a second address range corresponding to a subnet of a network to which the second communication interface belongs, and to deny communication from an address range falling outside the second address range.

9. The information processing apparatus according to claim 1, wherein the at least one processor further comprising:
displaying the first plurality of items for receiving selection of the first item and the second plurality of items for receiving selection of the second item on the same screen.

10. The information processing apparatus according to claim 1, wherein the at least one processor further comprising:
displaying, on a first screen, the first plurality of items for receiving selection of the first item, and
displaying, on a second screen, the second plurality of items for receiving selection of the second item.

11. The information processing apparatus according to claim 1,
wherein the information processing apparatus is a printing apparatus.

12. The information processing apparatus according to claim 1, wherein the at least one processor further comprising:
managing first one or more setting items and second one or more setting items,
wherein one or more setting values for the first one or more setting items, managed separately for the first communication interface and for the second communication interface, and wherein one or more setting values for the second one or more setting items are referred to both in processing using the first communication interface and in processing using the second communication interface.

13. The information processing apparatus according to claim 12, wherein the at least one processor further comprising:
   determining either the first setting value group or the second setting value group to be used for the setting of the one or more setting values for the second one or more setting items,
   wherein in the setting processing,
      the one or more setting values for the first one or more setting items are set by using one or more setting values included in the first setting value group and the second setting value group respectively, and
      the one or more setting values for the second one or more setting items are set by using one or more setting values included in the determined setting value group.

14. A control method of an information processing apparatus storing a plurality of setting values and including a first communication interface and a second communication interface, the control method comprising:
   receiving, from a user, selection of a first item from among a first plurality of items corresponding to a plurality of use environments, as a first use environment corresponding to the first communication interface;
   receiving, from a user, selection of a second item from among a second plurality of items corresponding to the plurality of use environments, as a second use environment corresponding to the second communication interface; and
   performing setting processing based on a first setting value group and a second setting value group,
   wherein the plurality of setting values includes the first setting value group corresponding to the first user environment and the second value group corresponding to the second use environment,
   wherein the setting processing includes setting of one or more setting values which are referred to both in processing using the first communication interface and in processing using the second communication interface.

15. A non-transitory computer readable storage medium storing a computer program for executing a control method of an information processing apparatus storing a plurality of setting values and including a first communication interface and a second communication interface, the control method comprising:
   receiving, from a user, selection of a first item from among a first plurality of items corresponding to a plurality of use environments, as a first use environment corresponding to the first communication interface;
   receiving, from a user, selection of a second item from among a second plurality of items corresponding to the plurality of use environments, as a second use environment corresponding to the second communication interface; and
   performing setting processing based on a first setting value group and a second setting value group,
   wherein the plurality of setting values includes the first setting value group corresponding to the first user environment and the second value group corresponding to the second use environment,
   wherein the setting processing includes setting of one or more setting values which are referred to both in processing using the first communication interface and in processing using the second communication interface.

* * * * *